(12) United States Patent
Poon et al.

(10) Patent No.: US 8,504,503 B1
(45) Date of Patent: Aug. 6, 2013

(54) PULSE MODULATED NEURAL INTEGRATOR CIRCUIT

(75) Inventors: Chi-Sang Poon, Lexington, MA (US); Joshua Jen Monzon, Somerville, MA (US); Guy Rachmuth, Charlotte, NC (US); Kuan Zhou, Scarborough, ME (US)

(73) Assignee: Massachusetts Institute of Technology, Cambridge, MA (US)

( * ) Notice: Subject to any disclaimer, the term of this patent is extended or adjusted under 35 U.S.C. 154(b) by 505 days.

(21) Appl. No.: 12/837,070

(22) Filed: Jul. 15, 2010

Related U.S. Application Data

(60) Provisional application No. 61/226,073, filed on Jul. 16, 2009, provisional application No. 61/226,075, filed on Jul. 16, 2009.

(51) Int. Cl.
*G06F 15/18* (2006.01)
*G06J 1/00* (2006.01)
*G06N 3/00* (2006.01)

(52) U.S. Cl.
USPC .......................................................... 706/33

(58) Field of Classification Search
None
See application file for complete search history.

(56) References Cited

U.S. PATENT DOCUMENTS
2004/0139040 A1 * 7/2004 Nervegna et al. ............... 706/15

OTHER PUBLICATIONS
Mitra et al. "A VLSI spike-driven dynamic synapse which learns only when necessary", ISCAS 2006, pp. 2777-2780.*
Rachmuth et al. Transistor analogs of emergent iono-neuronal Dynamics HFSP, vol. 2, No. 3, Jun. 2008, 156-166.*

* cited by examiner

*Primary Examiner* — Li-Wu Chang
(74) *Attorney, Agent, or Firm* — Daly, Crowley, Mofford & Durkee, LLP

(57) ABSTRACT

A pulse modulated neural integrator circuit is comprised of discrete analog electronic components and has a plurality of discrete stable states. In some embodiments, the pulse modulated neural integrator circuit is fabricated in whole or in part on an integrated circuit substrate using analog VLSI techniques. A phase locked loop circuit can use the pulse modulated neural integrator circuit in place of some conventional phase locked loop circuits.

21 Claims, 12 Drawing Sheets

PULSE MODULATED NEURAL INTEGRATOR CIRCUIT

CROSS REFERENCE TO RELATED APPLICATIONS

This application claims the benefit under 35 U.S.C. §119(e) of U.S. Provisional Application No. 61/226,073 filed Jul. 16, 2009 and U.S. Provisional Application No. 61/226,075 filed Jul. 16, 2009, which applications are incorporated herein by reference in its entirety.

STATEMENT REGARDING FEDERALLY SPONSORED RESEARCH

This invention was made with government support under Contract No. R21-EB005460 awarded by the National Institute of Health (NIH). The government has certain rights in the invention.

FIELD OF THE INVENTION

This invention relates generally to circuits configured to emulate biological functions and, more particularly, to a circuit that emulates short term memory associated with neurons, and applications thereof.

BACKGROUND OF THE INVENTION

Neurons are electrically excitable cells that process and transmit information around the nervous system. Neurons are the primary components of the brain and spinal cord in vertebrates, and ventral nerve cord in invertebrates.

Referring to FIG. 1, a neuron includes a nucleus as shown. The nucleus includes a soma, an axon, and a dendrite. The soma acts as a processing unit for processing of neuronal signals and is responsible for generating action potentials (i.e., voltages). Action potentials (also referred to as electrical signals herein) are further described below. The action potentials are propagated from the soma, through an axon, to the end of the neuron, which is also called an axon terminal. In the axon terminal, chemical neurotransmitters that chemically encode the electrical signal are produced, which cross a gap between the axon terminal and a dendrite of another neuron (not shown). This gap is part of the connection system of two neurons. The gap is referred to as a synapse. The synapse is described more fully below in conjunction with FIG. 2.

Referring now to FIG. 2, a synaptic cleft is formed between two neurons, and in particular, between an axon terminal of one neuron and a dendritic spine of another neuron. Electrical signals tend to propagate from the top to the bottom of this figure.

A synapse has three main parts, the axon terminal that contains the neurotransmitters, the synaptic cleft, and the dendritic spine.

As described more fully below, neurotransmitters generated by the pre-synaptic neuron (axon terminal), and which cross the synapse, bind to neurotransmitter receptors (also called input receptors herein) on the dendrite of the postsynaptic neuron. Every neuron has multiple dendrites that are all connected to other neurons. Current signals that propagate into the dendrites, also referred to as postsynaptic currents, form postsynaptic potentials that are summed at the soma of the post-synaptic neuron to produce new action potentials.

An action potential (also referred to herein as a spike or pulse) is a self-regenerating wave of electrochemical activity that allows excitable cells (such as muscle and nerve cells) to carry a signal over a distance. It is the primary electrical signal generated by nerve cells, and arises from changes in the permeability of the nerve cell's axonal membranes to specific ions. Action potentials are pulse-like waves of voltage that travel along several types of cell membranes. An exemplary action potential is generated on the membrane of the axon of a neuron, but also appears in other types of excitable cells, such as cardiac muscle cells, and even plant cells.

A typical action potential is initiated at the axon when the membrane is sufficiently depolarized (i.e., when its voltage is sufficiently increased). As the membrane potential is increased, both sodium and potassium ion channels begin to open. This increases both the inward sodium current (depolarization) and the balancing outward potassium current (repolarization/hyperpolarization). For small voltage increases, the potassium current triumphs over the sodium current and the voltage returns to its normal resting value, typically −70 mV. However, if the voltage increases past a critical threshold, typically 15 mV higher than the resting value, the sodium current dominates. This results in a runaway condition whereby the positive feedback from the sodium current activates even more sodium channels. Thus, the cell "fires," producing an action potential.

Synapses are special junctions that enable two neurons to communicate with each other. Synapses allow neurons to form interconnected circuit networks within the nervous system and are very crucial to the biological computations that underlie perception, thought, and memory. Synapses also provide the means for the nervous system to connect and control other systems of the body. For instance, a specialized synapse between a motor neuron and a muscle cell is called a neuromuscular junction.

Signal propagation through the synapse is promoted by release of neurotransmitters. In the axon terminal are vesicles containing neurotransmitters. The vesicles are able to release the neurotransmitters when stimulated. Arrival of an action potential into the axon terminal (e.g., from above in FIG. 2) results in an influx of calcium [Ca] ions from around the neuron. Influx of calcium into the axon terminal triggers a biochemical process that results to the release of neurotransmitters (e.g., glutamate) from the vesicles to the synaptic cleft about 180 microseconds after [Ca] influx.

As used herein, the brackets, [ ], are representative of an intracellular substance. As used herein, the nomenclature $[Ca^{2+}]$ is used interchangeably with the nomenclature [Ca].

Receptors on the dendrite spine bind to the neurotransmitter molecules and respond by opening nearby ion channels in the post-synaptic cell membrane, causing ions to rush in or out via ion channels, forming postsynaptic currents that change the local membrane potential (i.e., voltage) of the postsynaptic cell. The resulting change in voltage is called postsynaptic potential. In general, the result is an excitatory postsynaptic potential (EPSP), in the case of depolarizing excitatory postsynaptic currents (EPSC), or an inhibitory postsynaptic potential (IPSP), in the case of hyperpolarizing inhibitory postsynaptic currents (IPSC). Whether a synapse is excitatory or inhibitory depends on what type of ion channels are opened to conduct the postsynaptic current, which in turn is a function of the type of receptors and neurotransmitters employed at the synapse.

The last stage of signaling is termination. Presynaptic signals are terminated by the breakdown or reuptake of existing neurotransmitters. Reuptake is mainly localized in the presynaptic neuron and serves to recycle transported neurotransmitters.

The so-called "strength" of a synapse is related to a change in postsynaptic current resulting from activation of postsynaptic neurotransmitter receptors. Changes in synaptic strength can be short term (short term potentiation/depression, or STP/STD), which causes no permanent structural changes in the neuron. Typically, this change lasts a few seconds to minutes. Sometimes, strength changes are long term (long term potentiation/depression, or LTP/LTD). For these types of changes, repeated or continuous synaptic activation results in an alteration of the structure of the synapse itself. Learning and memory are believed to result from long term changes in synaptic strength, via a so-called "synaptic plasticity" mechanism.

The concept of synaptic strength leads to the notion of a strong synapse as differentiated from a weak synapse. For a strong synapse, an action potential in the presynaptic neuron triggers another action potential in the post-synaptic neuron. Conversely, for a weak synapse, an EPSP may not reach the threshold for action potential initiation in the post-synaptic neuron.

Each neuron forms synapses with many other neurons and therefore receives multiple synaptic inputs. When action potentials fire simultaneously in several of these neurons, multiple EPSCs are created which all generate EPSPs that sum up in the soma. Hence, the output of a neuron may depend on the input of many others, each of which may have a different degree of influence, depending on the strength of its synapse with a specific neuron.

It would be desirable to provide a circuit that can emulate the above-described operation of a neuron in real-time.

SUMMARY OF THE INVENTION

In accordance with one aspect of the present invention, a circuit operationally representative of signal propagation between a first neuron and a second neuron includes a circuit input node coupled to the circuit and a circuit output node coupled to the circuit. A pulse energy of a circuit input signal at the circuit input node influences a circuit output signal at the circuit output node to take on a respective one of a plurality of discrete stable frequency states.

In accordance with another aspect of the present invention, a method of operationally representing of signal propagation between a first neuron and a second neuron includes generating a signal that takes on a plurality of discrete stable frequency states, wherein the frequency state changes to a different discrete frequency state in response to a pulse signal.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
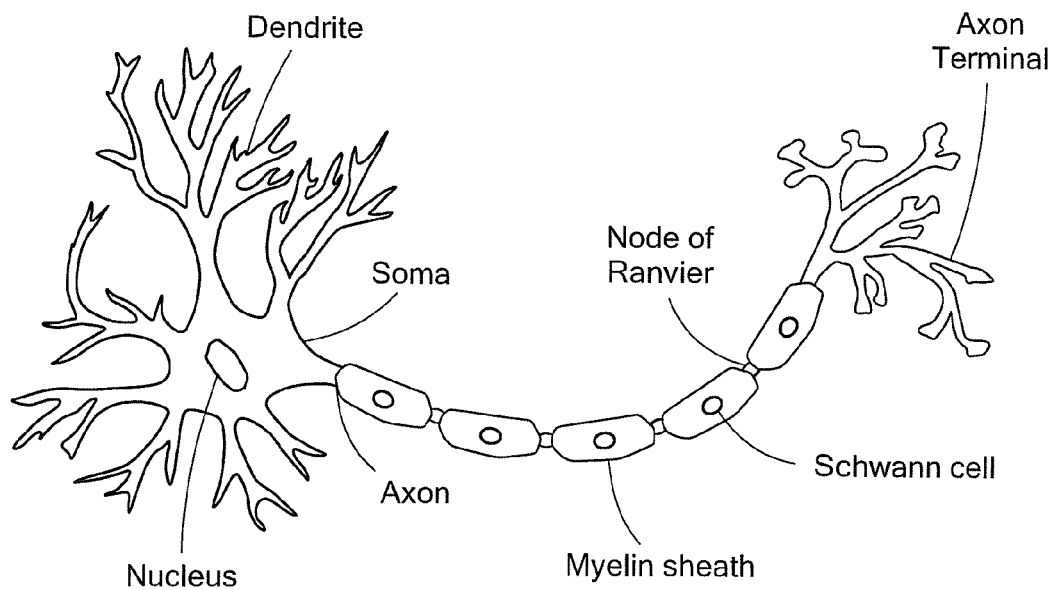
FIG. 1 is a pictorial showing a neuron.
Figure 2:
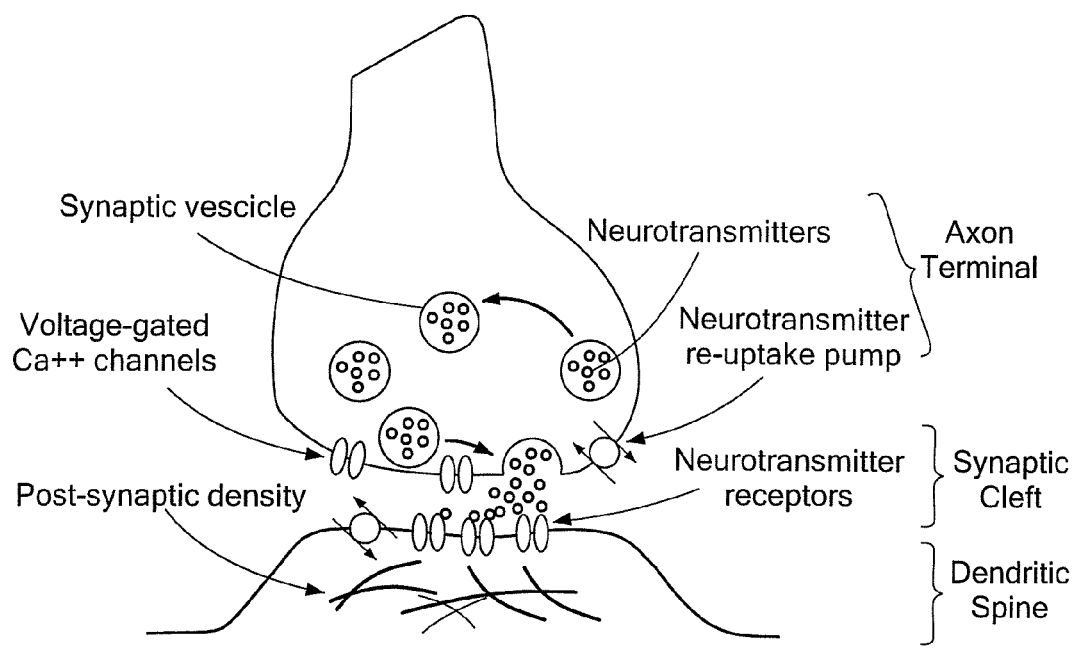
FIG. 2 is a is a pictorial showing a synapse between two neurons.

The brain's long-term information storage capabilities have led numerous researchers to study how the brain's memory system works. An important brain mechanism for temporarily assimilating and storing new information is the so-called "working memory." A major part of the brain's working memory system is the entorhinal cortex (EC). A main function of the EC is to facilitate interactions between the hippocampus, the part of the brain that is crucial to the formation of new memories, and the cerebral cortex.

The cellular basis of working memory remains unknown, but it is generally believed that graded (i.e., discrete states) persistent firing behavior is an essential element. This graded, activity-dependent memory process is referred to herein as "neural integration." Neural integration happens even in the absence of physical capacitive memory. A stable positive feedback mechanism may underlie this behavior.

Working memory processes exhibiting nonlinear graded persistent firing behavior (action potentials) are prevalent in the brain, in particular, the entorhinal cortex (EC). Recent evidence indicates that this behavior relies on a stable positive feedback between a neuron's calcium-sensitive non-specific cation (CAN) current ($I_{CAN}$) and calcium concentration of the cell. Described in figures below is a neuromorphic analog very-large-scale-integration (analog VLSI) circuit that can model all of or at least part of a pulse modulated neural integrator, which emulates the graded persistent memory behavior in the EC.

Circuits are described below that provide the stable positive feedback mechanism behavior using analog very-large-scale-integration (analog VLSI) circuits alone or together with external board level circuits. The circuits are able to simulate a neural integrator with multiple stable and graded (i.e., discrete) firing states, without using a large capacitor, to emulate the memory processes of the brain. The circuit employs positive feedback control to maintain a firing rate of the neuron.

Graded persistent firing activity, or neural integration, in the EC neuron has three main characteristics in response to external stimulation. A depolarizing event causes transient high frequency spiking of the EC neuron that eventually settles down to a stable firing rate that is higher than the firing rate before the event. Conversely, a hyperpolarizing stimulus causes a transient cessation of firing in the neuron, which gradually stabilizes to a firing rate that is lower than its original one. Lastly, any subsequent depolarizing stimulus increases the firing frequency of the neuron until it hits a maximum saturation frequency, and hyperpolarizing stimuli decrease the firing frequency of the neuron until it stops firing.

Studies suggest a positive feedback model for neural integration that involves the regulation of intracellular $Ca^{2+}$ concentration ($[Ca^{2+}]$) and resultant activation of a calcium-sensitive non-specific cation (CAN) current ($I_{CAN}$). This model indicates that the $[Ca^{2+}]$ is proportional to the firing rate of the neuron. Hence, as the firing rate increases, the $[Ca^{2+}]$ increases as well. The neuronal firing rate is modulated by the cation current, $I_{CAN}$, which depolarizes the membrane potential. To keep the voltage from increasing indefinitely, hyperpolarizing $K^+$ (potassium) currents regulate the membrane voltage and cause a spiking behavior.

The conductance of the CAN channel is affected by $[Ca^{2+}]$ via both direct and indirect pathways. Both of these pathways produce similar effects, namely, an increase in $[Ca^{2+}]$ concentration always leads to the increase of the conductance of CAN channels. The direct effect of $[Ca^{2+}]$ concentration regulates the balance between open and closed states of the CAN channel. The indirect effect of $[Ca^{2+}]$ concentration goes through a phosphorylation and dephosphorylation pathway, which affects the balance of CAN channels between high and low conductance states. By modifying the CAN channel's conductance via $[Ca^{2+}]$ the magnitude of the $I_{CAN}$ can be modulated (i.e., changed).

The indirect effect of the $[Ca^{2+}]$ concentration occurs when spiking activity in the neuron causes L-type calcium channels to open resulting in an increase the intracellular $[Ca^{2+}]$. This intracellular $[Ca^{2+}]$ is regulated by pumping and buffering processes to regulate the $[Ca^{2+}]$ within a certain range. When a depolarizing stimulus is applied to the neuron, the $[Ca^{2+}]$ crosses a high $[Ca^{2+}]$ threshold transition point resulting in production of a compound, referred to herein as "X," which is a byproduct of the indirect pathway of CAN channel conductance regulation. The exact nature of the compound, X, is still unknown, but its behavior towards the conductance of the CAN channels has been analyzed. Compound X controls the balance between kinases and phosphatases in the neuron, which determine the phosphorylated or high conductance (H) and unphosphorylated or low conductance (L) state of a discrete CAN channel. As the intracellular concentration of the compound X (i.e., [X]) increases, the probability that each discrete CAN channel is in the H state becomes higher. Hence, the total CAN channel conductance increases correspondingly. As a result, more $I_{CAN}$ flows to depolarize the cell membrane, which causes more spiking activity and increased equilibrium $[Ca^{2+}]$. Consequently, the increased spiking activity of the cell is sustained.

Similarly, when a hyperpolarizing stimulus occurs, the neuron stops firing, thus deactivating the L-type $Ca^{2+}$ channels. This decreases the intracellular $[Ca^{2+}]$ below a low $[Ca^{2+}]$ threshold transition point, causing the breakdown of compound X and reduction of the concentration of [X]. This decrease in the concentration of [X] causes a decrease in the number of individual CAN channels that are in the L state and results in a smaller $I_{CAN}$ necessary to depolarize the membrane, bringing down the overall equilibrium firing rate of the neuron.

Such a biological model can be implemented in an analog VLSI circuit. Circuits and techniques described herein can be used to explore details of neuron interactions, providing a computational platform for neuroscientists. The CAN channel in the model is ligand dependent because its conductance is affected by $[Ca^{2+}]$ directly, and also indirectly through [X]. Its dependence on $[Ca^{2+}]$ is sigmoidal in shape, and has four time constants that govern its temporal kinetics. Two of these time constants characterize the temporal opening of the channel and the other two govern the temporal closing of the channel.

Models proposed by previous studies used linear models to describe the behavior of the CAN channel. However, this linear simplification ignores the sigmoidal dynamics of the biological ionic channels. An analog VLSI approach can better emulate the dynamics of the CAN channel because certain analog circuit blocks described below tend to have the same nonlinear sigmoidal and temporal characteristics as biological CAN channels.

Conventional neuromorphic sub-threshold analog VLSI circuits provide only a narrow input voltage dynamic range, typically only ±100 mV. Such a narrow range makes them highly susceptible to variabilities of input offset voltage, typically in the mV range, which is typical of weak-inversion MOS transistors. However, in contrast to silicon electrical systems, biological proteins in biological ionic channels demonstrate uniform sigmoidal I-V relationship and respond well to small voltage changes. This discrepancy between biological and silicon electrical systems must be solved.

This limited dynamic range can be increased if the analog VLSI circuits operate with strong inversion. However, power consumption of strong-inversion operation is much greater than weak-inversion operation, making strong-inversion operation undesirable in an analog VLSI implementation. In addition, the similarities between ionic channels and MOS devices disappear in strong-inversion operation.

Limitations in dynamic range in conventional neuromorphic analog VLSI circuits preclude robust emulation of complex neuronal behaviors beyond simple spiking or specific ion channel dynamics with limited computational capabilities. Conventional analog VLSI circuits must be tuned very carefully after fabrication in order to compensate for the device mismatches and offset voltages. This tends to make the large system design with conventional analog VLSI impractical as so many parameters are involved.

To extend the dynamic range, circuits described below in FIGS. 5 and 6A use several key current-mode low power CMOS circuit designs for robust neuromorphic modeling, e.g., a wide-range transconductance amplifier (WR-TCA) and a wide-range differential pair (WR-DP), which increase the corresponding dynamic range by an order of magnitude to be greater than about ±1 volt, attainable with a 5 volt supply voltage (without using floating gate techniques). As described below, these two circuit components are used in conjunction with a log-domain filter (LDF) and with current-mode filters having input and output currents tunable over five orders of magnitude. Such filters can interface directly with other wide-range current-mode circuits. The LDF, the WR-TCA, and the WR-DP circuits are described below in conjunction with in FIG. 6A.

Since input voltage linear range is determined as a ratio between bias current $I_B$ and overall transconductance, $G_m$, of the WR-TCA, we can either increase $I_B$ or reduce $G_m$ to extend the dynamic range. $G_m$ reduction is a preferred method since increasing $I_B$ tends to result in a higher power consumption. The WR-TCA 106 shown below in FIG. 6A reduces the $G_m$ by a factor of 20, to a value of about sixteen nanoamps per volt by a combination of three different techniques, which leads to an overall linear range of greater than one volt. A first technique increases the linear dynamic range by applying differential inputs (see, e.g., V1, V2, circuit 106, FIG. 6A) to the bulk substrate terminals ($V_{BS}$) of a PMOS differential pair (transistors with V1 and V2 inputs, circuit 106, FIG. 6A) instead of to the gates. A second technique increases the linear dynamic range by degeneration of the PMOS differential pair, by adding resistors or transistors below the differential pair, as shown in circuit 106 of FIG. 6A. A third technique increases the linear dynamic range by providing a bump linearization technique to the WR-TCA circuit to extend the linear range by way of a series connection of two transistors 106a shown in FIG. 6A. The dynamic range of the WR-TCA can be extended to be greater than 1.5 volts. The WR-DP circuit (e.g., 104, FIG. 6A) functions in a way similar to WR-TCA.

Figure 3:
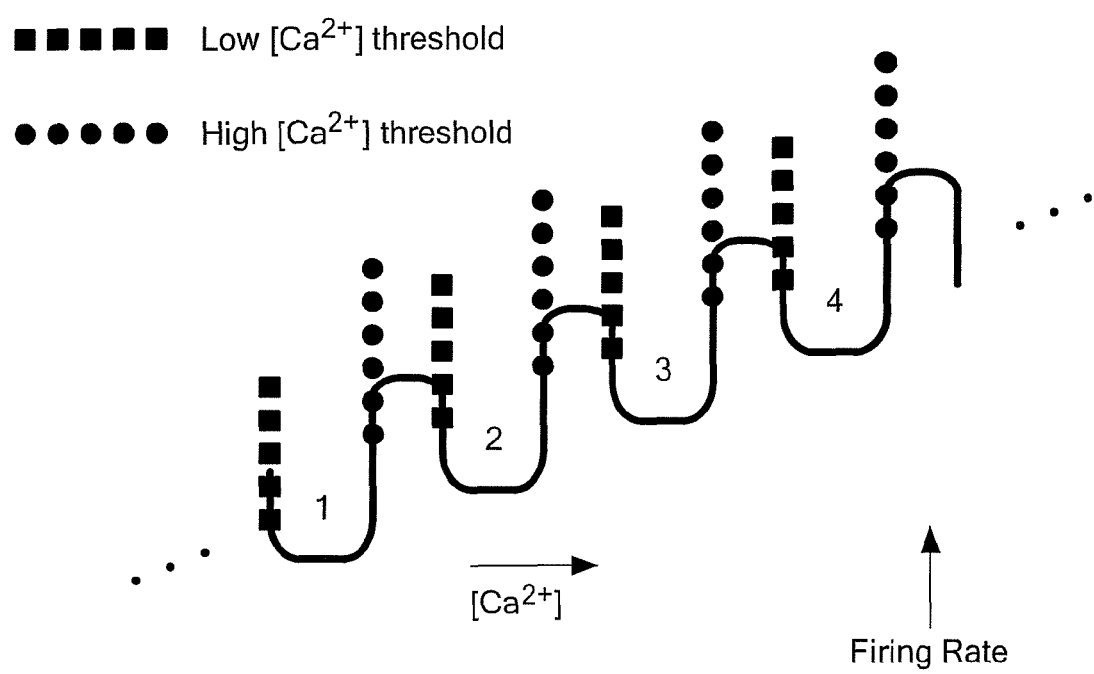
FIG. 3 is a graph showing intracellular calcium and associated threshold levels and states.

Referring now to FIG. 3, a graph is representative of biological stable states associated with intracellular $[Ca^{2+}]$. The graph includes a horizontal scale in units of $[Ca^{2+}]$ concentration in arbitrary units and a vertical scale in units of action potential firing rate in arbitrary units. Four stable states 1-4 are shown. To go from a first state to a second higher state, i.e., to the right in FIG. 3, the concentration of $[Ca^{2+}]$ must first increase to a high threshold of the first state indicated by a vertical dashed line composed or round dots, resulting in a rapid increase in action potential firing rate. Then the biological systems settles to the second higher state with a firing rate higher that at the first state and with a concentration of $[Ca^{2+}]$ higher than at the first state.

Conversely, to go from a first state to a second lower state, i.e., to the left in FIG. 3, the concentration of $[Ca^{2+}]$ must first decrease to a low threshold of the first state indicated by a vertical dashed line composed or square dots, resulting in a rapid decrease in action potential firing rate. Then the biological systems settles to the second lower state with a firing rate lower that at the first state and with a concentration of $[Ca^{2+}]$ lower than at the first state before.

While four stable states are shown, there can be more than four or fewer than four stable states.

The biological system remains stable because of the existence of several graded $[Ca^{2+}]$ levels. Even though the $[Ca^{2+}]$ directly affects the conductance of the CAN channel, transitions between graded firing rates only occur when $[Ca^{2+}]$ passes the low and high $[Ca^{2+}]$ thresholds. These thresholds are dynamic, because their values change depending on the current firing rate. Thus, each graded level has its own low and high $[Ca^{2+}]$ thresholds, allowing the graded levels to remain stable despite small perturbations in the positive feedback path. Therefore, a transition to another graded level could occur only in the presence of a strong stimulus to the neuron.

The firing rate of the neuron eventually saturates after several depolarization steps (increases of $[Ca^{2+}]$). Likewise, the firing rate eventually hits the baseline firing frequency (usually zero) after several hyperpolarizing steps (decreases of $[Ca^{2+}]$). The maximum firing rate is a result of the existence of only a finite number of CAN channels. In a neuron, if the firing rate reaches its maximum value, all of the CAN channels are open and in an "H" state. This limits a maximum amount of cation current, $I_{CAN}$. Thus, further depolarizing steps would not increase the CAN channel conductance. The same reasons holds for further hyperpolarizing steps. Eventually all the CAN channels will be in a closed state, causing $I_{CAN}$ to be zero.

It will become apparent from discussion below in conjunction with FIG. 5, that a so-called threshold detector circuit can provide the high and low thresholds, resulting in discrete states, i.e., discrete output frequencies.

Figure 4:
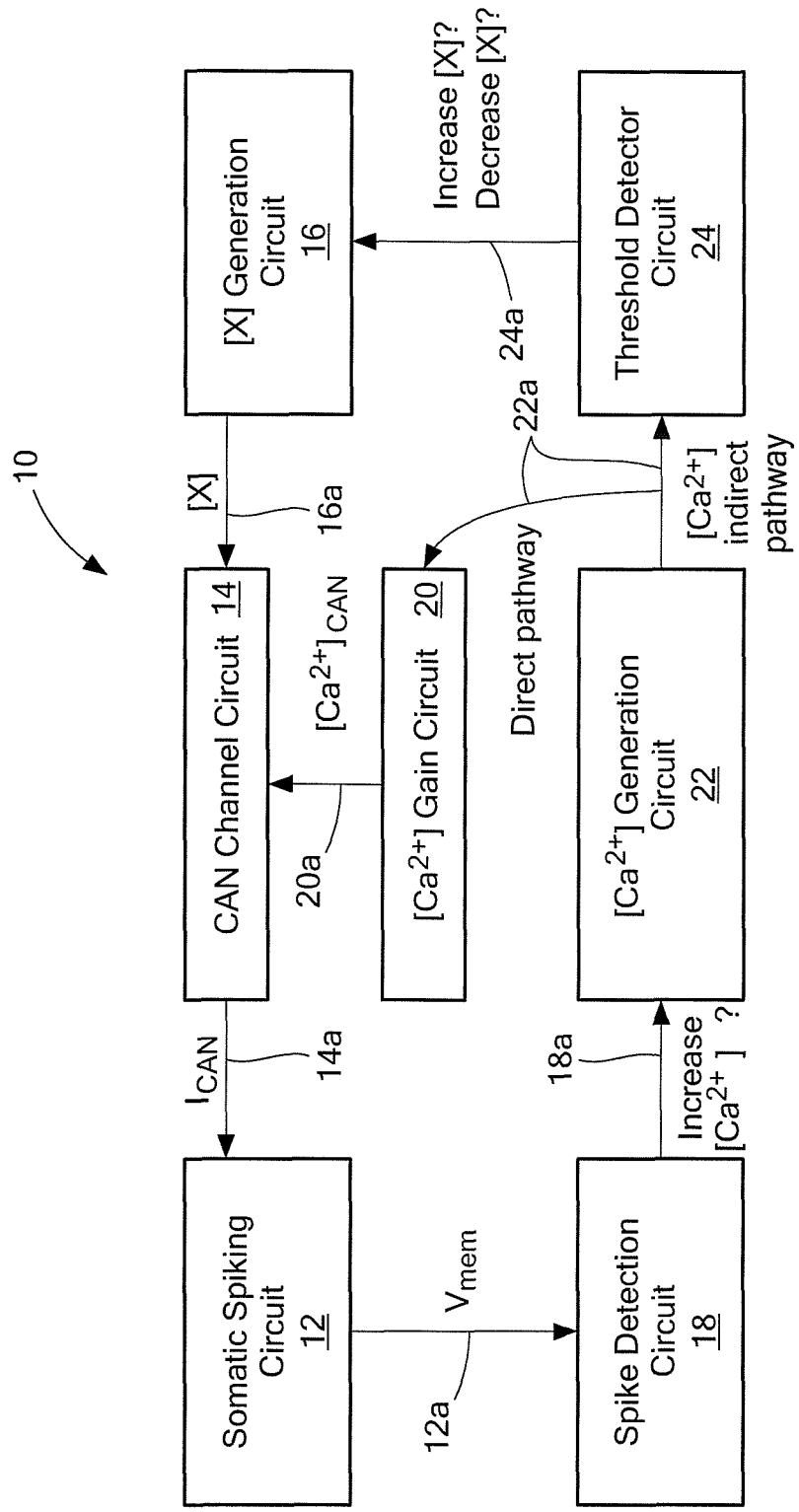
FIG. 4 is a block diagram of an exemplary pulse modulated neural integrator circuit that can represent transmission of a signal from one neuron to another neuron.

Referring now to FIG. 4, a block diagram is representative of a circuit 10 that can model and provide the above described graded states of $[Ca^{2+}]$ concentration and action potential firing rates. The circuit 10 is referred to herein as a "pulse modulated neural integrator."

The circuit 10 includes a somatic spiking circuit 12 for generating a spiking signal 12a, $V_{mem}$, representative of action potentials. The spiking signal 12a is received by a spike detection circuit 18 configured to generate a detected spiking signal 18a (i.e., a squared up spiking signal) representative of calls for an increase or a decrease of $[Ca^{2+}]$ concentration.

The circuit 10 includes a $[Ca^{2+}]$ generation circuit 22 coupled to receive the detected spiking signal 18a and configured to generate a $[Ca^{2+}]$ concentration signal 22a representative of a biological $[Ca^{2+}]$ concentration.

The circuit 10 also includes a $[Ca^{2+}]$ gain circuit 20 coupled on a direct path to receive the $[Ca^{2+}]$ concentration signal 22a and configured to generate a gained $[Ca^{2+}]$ signal 20a. A CAN channel circuit 14 is coupled to receive the gained $[Ca^{2+}]$ signal 20a and configured to generate an Ican signal 14a representative of a current flowing in biological CAN channels, which is received by the somatic spiking circuit 12. It will be understood from discussion of behavior below, that the CAN channel circuit 14 is representative of the biological CAN channels.

The circuit 10 also includes a threshold detector circuit 24 coupled on an indirect path to receive the $[Ca^{2+}]$ concentration signal 22a and configured to generate an [X] control signal 24a. Compound [X] and the associated indirect path are described above. The circuit also includes an [X] generation circuit 16 coupled to receive the [X] control signal 24a and configured to generate an [X] concentration signal 16a, representative of a concentration of the above-described [X] compound, which is also coupled to the CAN channel circuit 16.

It will be understood that the threshold detector circuit 24 and the indirect pathway in general are involved in determination of the discrete stable states of the circuit, which are represented by the graph of FIG. 3 above.

It should be understood that the circuit is arranged in a positive feedback loop. As is known, most forms of positive feedback loops tend to be unstable (i.e., to oscillate uncontrollably). However, the circuit 10 is stable.

Three of the blocks, namely, the CAN channel circuit 14, the somatic spiking circuit 12, and the spike detection circuit 18, have been fabricated using a Metal Oxide Semiconductor Implementation System (MOSIS) process using an AMI 1.5 um process. Other blocks have been fabricated as discrete support circuits to provide the positive feedback loop that maintains the firing frequency of the circuit 10. However, in other arrangements, all of, or other parts of the circuit 10 of FIG. 4 can be provided in analog VLSI form.

Figure 5A:
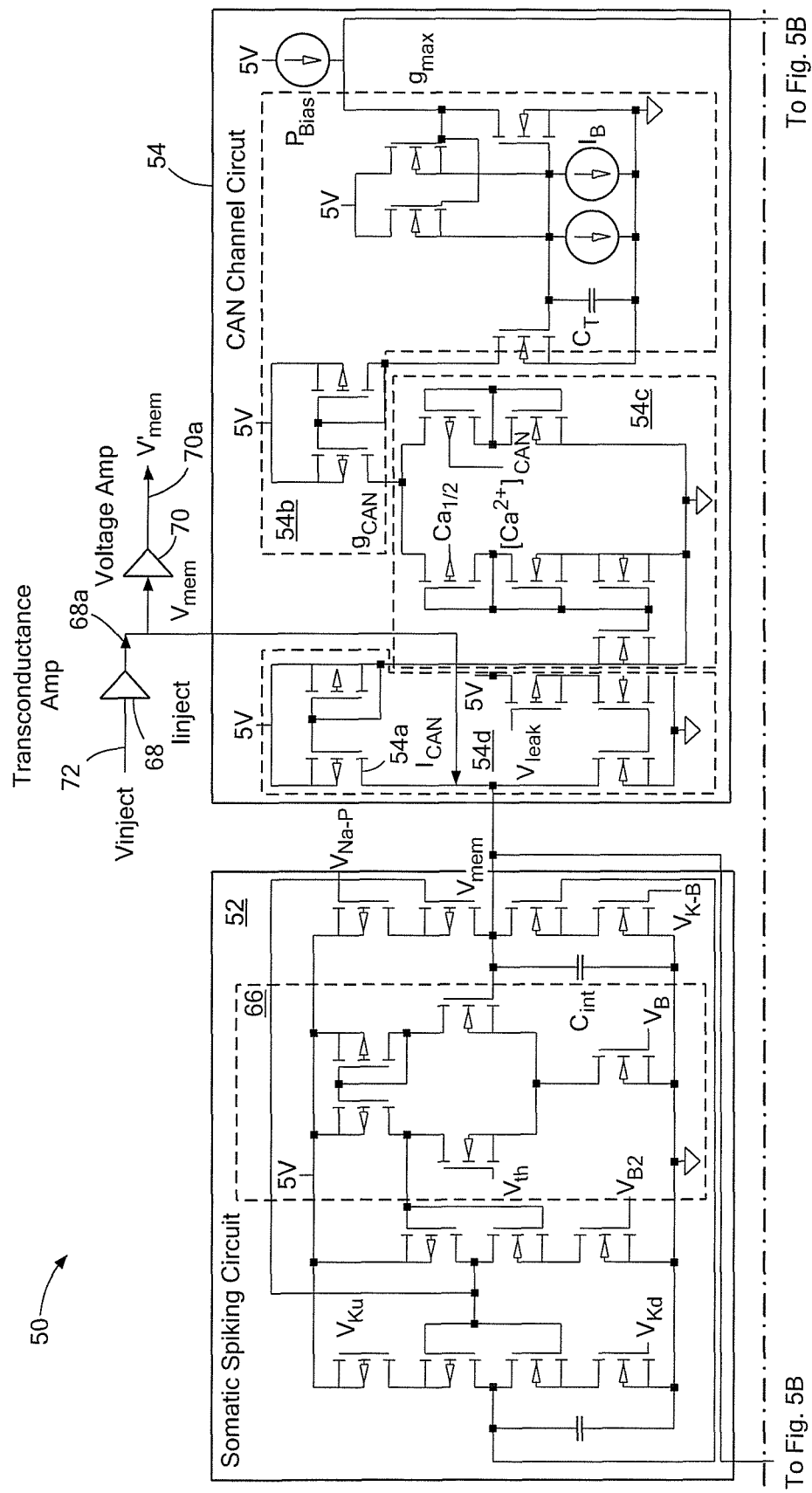
FIG. 5 is a schematic drawing showing further details of the pulse modulated neural integrator circuit of FIG. 4, here shown in the form of discrete analog circuits suitable for integration onto an analog very large scale integrated circuit (analog VLSI)
Figure 5B:
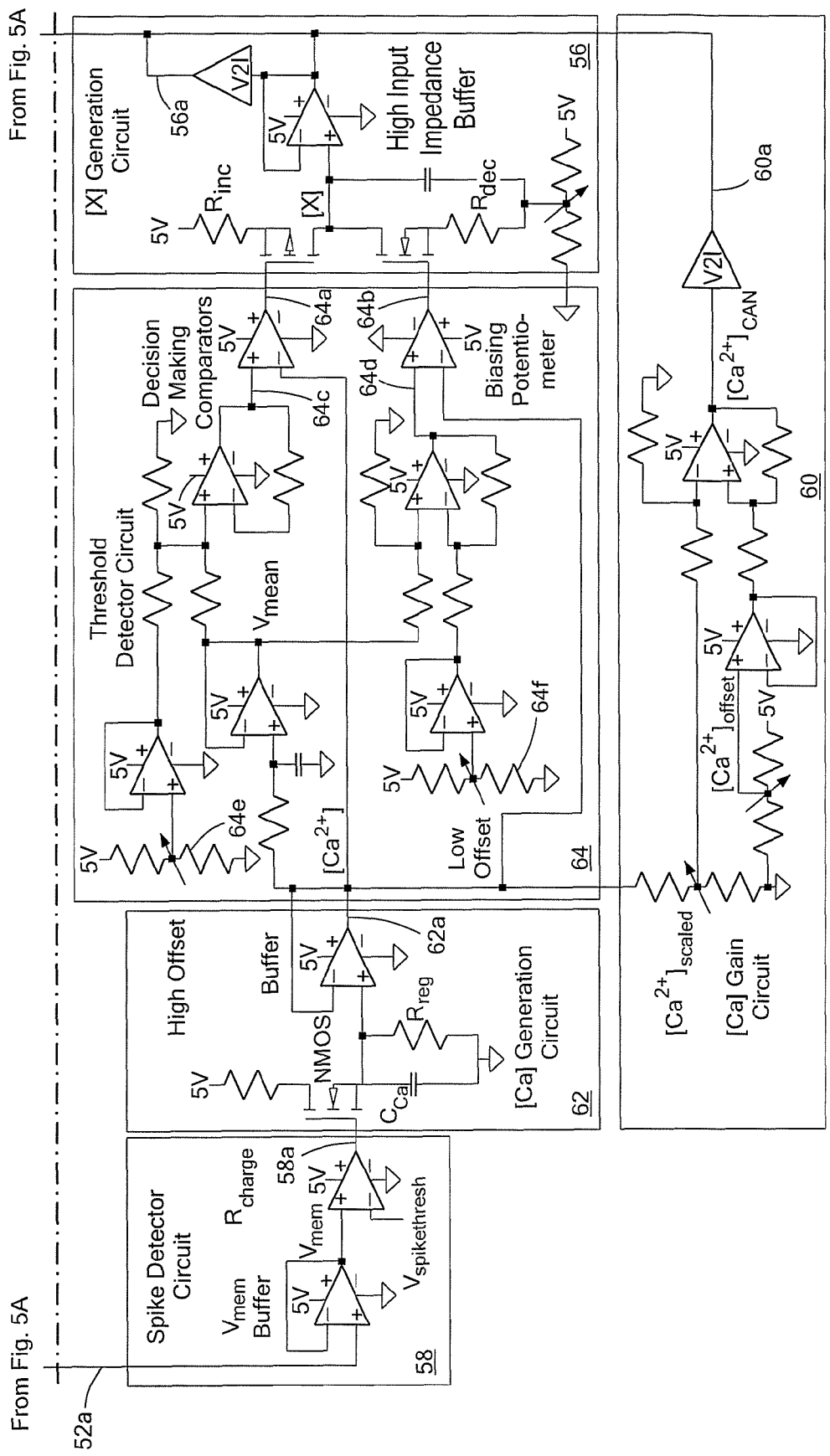

Referring now to FIG. 5, an exemplary circuit 50, a pulse modulated neural integrator, shows further details of the circuit of FIG. 4. The pulse modulated neural integrator includes a somatic spiking circuit 52, a spike detection circuit 58, a $[Ca^{2+}]$ generation circuit 62, a $[Ca^{2+}]$ gain circuit 60, a CAN channel circuit 54, a threshold detector circuit 64, and an [X] generation circuit 56, coupled together ash shown, and which can all be the same as or similar to circuits with similar names in FIG. 4.

The circuit 50 includes a node, $V_{mem}$, at which a voltage output signal 52a is generated (referred to herein a as $V_{mem}$ signal, the same as or similar to signal 12a of FIG. 4) that represents an instantaneous membrane potential (also referred to herein as a $V_{mem}$ voltage). The node, $V_{mem}$, is coupled to a membrane capacitor ($C_{int}$). The node, $V_{mem}$, is also coupled to an input of a differential transconductance amplifier circuit 66 (TCA) while the other input of the TCA is connected to a threshold voltage ($V_{th}$), which is representative of a neuronal threshold potential.

In operation, the input current to the TCA 66 (i.e., to the node $V_{mem}$) charges the capacitor, $C_{int}$, and increases the voltage on the capacitor, $C_{int}$, until its voltage rises above the threshold voltage, $V_{th}$. Upon passing the threshold voltage, an output signal at the node, $V_{mem}$, generated by the somatic spiking circuit 52 spikes and resets the signal 52a to its resting value. As the magnitude of an input current, $I_{CAN}$, 54a increases, the somatic spiking circuit 52 fires more often because the voltage on the capacitor, $C_{int}$, charges up to the level of the threshold voltage, $V_{th}$, in a shorter amount of time. The input current, $I_{CAN}$, the CAN current, is generated by the CAN channel circuit 54.

The voltage signal 52a is a voltage output signal generated by the pulse modulated neural integrator circuit 50, and is a spike signal having relatively short duration and repetitive voltage spikes. An input signal, Iinject, is a pulse input current signal injected into the node, $V_{mem}$. Thus, as described more fully below, injection of the current, Iinject, as the input signal results in changes a frequency of the output voltage signal 52a at the node, $V_{mem}$. The changes in frequency take on discrete stable states, like the stable states shown above in conjunction with FIG. 3. Changes in the stable state occur when the input signal, Iinject, has sufficient energy (i.e., pulse width combined with amplitude).

In some arrangements, a transconductance amplifier 68 can be coupled to the node, $V_{mem}$, and can be used to inject the input current pulses, Iinject, 68A into the node, $V_{mem}$. In some arrangements, a voltage amplifier 70 can be coupled to the node, $V_{mem}$, and can buffer the voltage output signal 52a to provide a buffered voltage, $V'_{mem}$, 70a The spike detection circuit 58 converts the spikes of the somatic circuit output signal 52a to a series of square waves in a signal 58a, which have a high state voltage when a spike occurs in the signal 52a The $[Ca^{2+}]$ generation circuit 62 operates as an integrator with leakage. Namely, the output signal 58a from the spike detector circuit 58 is used to gate a current source that charges a small capacitor, Ca, which has a voltage that represents the instantaneous $[Ca^{2+}]$ inside the nerve cell. The dynamics of $[Ca^{2+}]$ regulation through buffering processes are determined by a resistor, $R_{reg}$, which discharges the capacitor, Ca, to bring the $[Ca^{2+}]$, i.e., the signal 62a, back to its resting level.

The [Ca] gain circuit 60 uses a simple resistor divider network to tune the feedback gain of the pulse modulated neural integrator 50. As described below, in some embodiments, the [Ca] gain circuit 60 has a selected gain less than one.

The neural integrator circuit 50 has several graded (discrete) states, each of which is associated with its own low and high thresholds that determine transitions between the states. The threshold detector circuit 64 generates respective adaptive threshold signals 64c, 64d for each stable system state.

The $[Ca^{2+}]$ concentration signal 62a is an input signal to the threshold detector circuit 64. To avoid loading effects by the threshold detector circuit 64, the $[Ca^{2+}]$ generation circuit includes an output buffer.

The threshold detector circuit 64 includes a first order RC filter to generate an average of the $[Ca^{2+}]$ concentration signal 62a. The output signal from the RC filter is referred to as $V_{mean}$. An offset voltage is added to $V_{mean}$) resulting in an adaptive high threshold 64c. The adaptive high threshold 64c is compared with the $[Ca^{2+}]$ concentration signal 62a to generate a signal 64a representative of depolarizing events that lead to an increase in [X]. Similarly, an offset voltage is subtracted from $V_{mean}$ resulting in an adaptive low threshold 64d. The adaptive low threshold 64d is compared with the $[Ca^{2+}]$ concentration signal 62a to generate a signal 64b representative of polarizing events that lead to a decrease in [X]. Thus, the threshold detector circuit generates two [X] control signals, 64a, 64b.

The graded states of the circuit 50 are determined in accordance with the thresholds 64c, 64d, which in-turn, are determined in accordance with resistor dividers 64e, 64f, respectively. In other words, the more the thresholds 64c, 64d are set apart from a steady state value of the [Ca] concentration signal 62a, the further the [Ca] concentration signal 62a must move before it crosses one of the thresholds and causes the circuit 50 to take on a new graded (discrete) state. In some embodiments, the offset voltages generated by the resistor dividers 64e, 64f are both about 100 millivolts, which results in the circuit 50 having about twenty graded (discrete) states of the frequency of the output signal 52a. However, a useful range of the offset voltages can be any value in a range of about 200 millivolts to about 50 millivolts, resulting in about 10 and 40 graded states, respectively. However, still other offset voltages and numbers of graded states can be achieved. It will be appreciated that a higher offset voltage results in fewer graded states. It will also be understood that a smallest offset voltage that can be used may be related to an accuracy of the output comparators.

It will be understood that the threshold signals 64c, 64d are adaptive, and depend upon a magnitude of the [Ca] concentration signal 62a. This is the same as or similar to operation of the adaptive thresholds shown above in conjunction with FIG. 3, which figure is used to describe a neuronal system. Thus, the threshold detector circuit 64 emulates aspects of a neuronal system.

The [X] generation circuit 56 includes two FETs coupled in a totem pole arrangement to receive the two above-described [X] control signals 64a, 64b. The [X] control signals 64a, 64b generated by the threshold detector circuit 64 are used as inputs to the gates of the FETs, and are used to regulate an [X] signal, i.e., a voltage at a capacitor $C_x$. During a depolarizing event, one of the transistors causes a current to charge $C_x$ and increase the [X] signal. During a hyperpolarizing event, the other transistor causes the [X] signal to decrease as $C_x$ is discharged by a current sink. Together, these two FETs regulate the voltage at the capacitor, $C_x$, and the rate at which the FETs charge and discharge the capacitor, $C_x$, is controlled by the $[Ca^{2+}]$ concentration signal 62a.

A biological CAN channel has substantial nonlinear dynamics, which are emulated by the CAN channel circuit 54. The CAN channel circuit 54 includes a log-domain filter (LDF) circuit 54b, which models temporal kinetics of the CAN current. The LDF 54b is further described below in conjunction with FIG. 6A. And input signal to the LDF 54b is a linear combination of the gained $[Ca^{2+}]$ signal 60a (a current signal) and the [X] concentration signal 56a (another current signal), which are summed at a summing node. The two signals 60a, 56a together represent the biological CAN channel's dependence upon both compounds. An output of the LDF 54b represents a time-varying behavior of the maximum conductance of the CAN channel.

A log-domain filter (LDF) is one member of a class of translinear circuits, which has nonlinear internal circuits, but which provides a linear output signal and transfer function. The LDF 54b operates by using a nonlinear (exponential) Vin–Vout relationship.

The CAN channel circuit 54 also includes wide-range differential pair (WR-DP) 54c coupled to the LDF 54b. The WR-DP 54c is further described below in conjunction with FIG. 6A. The WR-DP 54c has a sigmoidal transfer function related to the $[Ca^{2+}]$ concentration signal 62a (the direct path), to the [X] concentration signal (indirect path), and the channel's conductance. The WR-DP 54c has three inputs. A first input is a current output from the LDF 54b. The other two inputs are differential inputs, a first one of which, $[Ca^{2+}]_{CAN}$, correspond to the $[Ca^{2+}]$ concentration signal 62a, and a second one of which, $Ca_{1/2}$, corresponds to a half activation level of the CAN channel, which can be a fixed level. An output signal of the WR-DP 54c is a current signal, which is provided to a current mirror 54d, which generates the current signal, $I_{CAN}$, which is fed back to the spiking somatic circuit 52 at the node, $V_{mem}$.

Figure 6A:
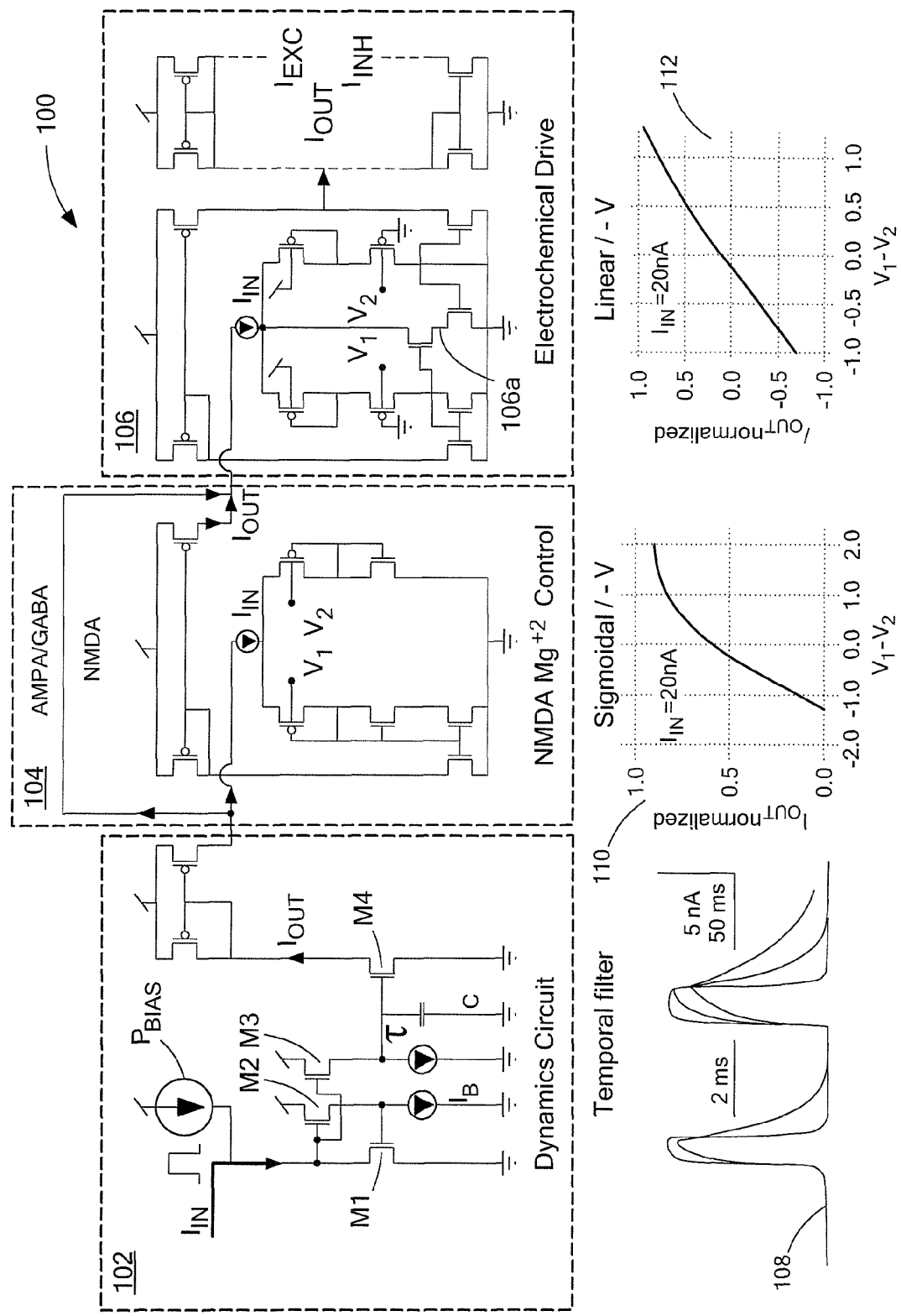
FIG. 6A is a schematic drawing showing a portion of the pulse modulated neural integrator circuit of FIG. 5 and also showing a series of graphs showing transfer function characteristics of the circuit portion of FIG. 6A.

Referring now to FIG. 6A, a general ionic channel circuit 100 is similar to the CAN channel circuit 54 of FIG. 5, but with signal propagation from left to right as opposed to right to left propagation shown in FIG. 5. A log domain filter (LDF) 102 can be the same as or similar to the LDF 54b of FIG. 5. A wide-range differential pair (WR-DP) 104 can be the same as or similar to the WR-DP 54c of FIG. 5. A wide-range transconductance amplifier (WR-TCA) 106 is not present in FIG. 5. However, other embodiments of the CAN channel circuit 54 of FIG. 5 can employ the WR-TCA circuit 106. Both the current mirror 54d of FIG. 5 and the WR-TCA 106 of FIG. 6 provide output signals as currents, and both are referred to herein as "current-generating circuits."

The difference between the CAN channel circuit 54 and the general ionic channel circuit 100 of FIG. 6A is related to two published papers, both incorporated by reference herein, namely:

E. Fransen et al, "Mechanism of graded persistent cellular activity of entorhinal cortex Layer V Neurons," *Neuron*, 2006, pp. 735-736, and T. Ehara et al., "Calcium-activated non-selective cation channel in ventricular cells isolated from adult guinea-pig hearts," *Journal of Physiology*, 1987, pp. 117-133.

In particular, the paper by Ehara et al. discusses that the CAN channel conductance may not be dependent upon membrane potential voltage ($V_{mem}$) (see, e.g., graph 118 of FIG. 6B below). Thus, the CAN channel circuit 54 of FIG. 5 as shown does not include the WR-TCA circuit 106, which can be used to model this dependence. As described above, other embodiments of the CAN channel circuit 54 of FIG. 5 can employ the WR-TCA circuit 106.

Neuromorphic circuits employ current-mode techniques to take advantage of the wide current dynamic range of sub-threshold-biased transistors (from sub-pA–nA). An LDF circuit is one member of a class of translinear circuits, which exploit nonlinear internal transistor characteristics to generate linear outputs. The LDF 102 operates by using a nonlinear (exponential) $V_{IN}$–$I_{OUT}$ relationship in a bipolar or a sub-threshold MOS transistor to generate a linear filter response of the form:

$$\frac{d}{dt}I_{OUT} + \tau I_{OUT} = I_{IN}$$

This equation has a solution of the form:

$$I_{OUT}(t) = I_{IN} \cdot e^{-t/\tau}$$

Where:

$$\tau = (C\phi_t)/(I\kappa)$$

where:
$\phi_t = kT/q$ = thermal noise voltage = 26 mV at room temperature, and
C = capacitance LDFs are usually designed using bipolar junction transistors (BJTs) biased above threshold to take advantage of their exponential $I_C$–$V_{BE}$ relationship. These designs assume that base current is negligible (i.e. $I_{BASE} \ll I_C$) and can be neglected. However, for low collector current ($I_C$) in the pA to nA range, this assumption may not hold and could generate significant errors in circuit operation. LDFs described herein can use CMOS transistors because of their nearly infinite input impedance, which is better suited to low current operation.

The MOS log-domain filter 102 operates by compressing an input signal ($I_{IN}$) to a voltage by a reverse exponentiation of a transistor M1. This voltage is integrated on a capacitor, C, at a rate that is dependent on a tunable current source $I_T$. The output voltage is exponentiated via a transistor M4 to generate an output current, $I_{OUT}$. A $P_{BIAS}$ current sources act to bias the circuit when $I_{IN} = 0$. Transistors M2 provides a feedback to transistor M1 and transistor M3 duplicates the current of transistor M2.

The time-constant is controlled by current $I_T$, which is generated by a transistor operating in sub-threshold. Thus, $I_T$ may be turned over six orders of magnitude to produce dynamics from μs to 10's of seconds. Several filters may be arranged by combining first order filters using current mirrors to produce higher order dynamics.

For a CMOS implementation, the above equations include a κ factor, a fabrication dependent parameter representative of capacitive coupling. Thus, these LDFs are subject to κ-related mismatch. However, this mismatch does not affect the behavior of the circuit, only the filter time constant value. Because the circuits described herein do not require high precision, this problem is circumvented by tunability of $I_T$.

A transconductance amplifier (TCA) has a linear range of $V_L$, where $V_L$ is defined as $V_L = I_B/G_m$, and $I_B$ is a bias current and $G_m$ is a transconductance To increase the dynamic range, either $I_B$ or $G_m$ (or both) must be increased. Because increasing $I_B$ will increase power consumption, it is advantageous to instead extend dynamic range by altering $G_m$ by adapting a side-range circuit configuration.

The WR-TCA 106 operates by using a backgate of a PMOS transistor to control the output current via $V_{BS}$, a bulk substrate voltage, thus introducing a 1-κ term in the equation for $G_m$.

While a log-domain filter is shown and described, in other embodiments, another type of filter can be used.

A graph 108 shows exemplary responses of the LDF 102 to pulse input signals, $I_{IN}$. A graph 110 shows a voltage, ($V_1 - V_2$), to current, $I_{OUT}$, transfer function of the WR-DP 104. A graph 112 shows a voltage, ($V_1 - V_2$), to current, $I_{OUT}$, transfer function of the WR-TCA 106. A transfer function through all three of the graphs 108-112 appears similar to the curve of graph 108 alone.

Figure 6B:
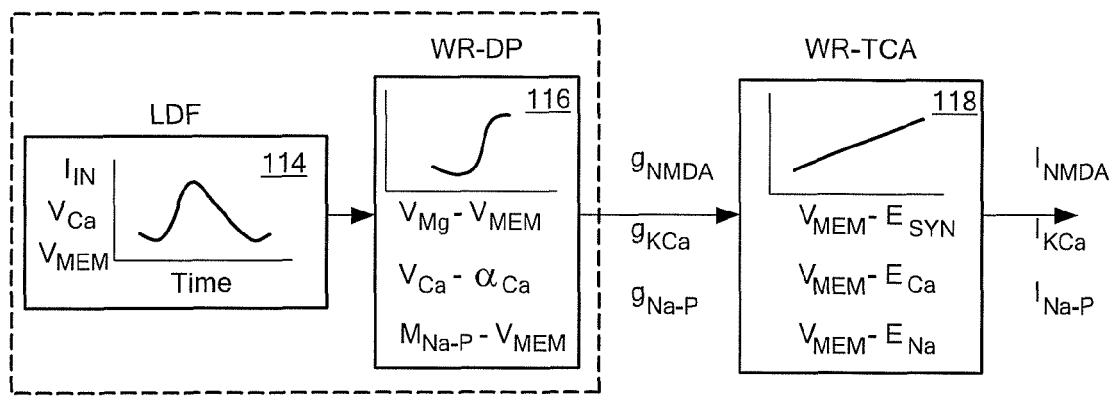
FIG. 6B is a series of graphs showing transfer functions characteristics neuronal activity.

Referring now to FIG. 6B, a graph 114 has a horizontal axis in units of time in arbitrary units and a vertical scale in units of current or voltage in arbitrary units. Graph 114 corresponds to a membrane potential voltage ($V_{mem}$) of an ionic channel within a neuron. A graph 116 has a horizontal axis in units of voltage in arbitrary units and a vertical scale in units of transconductance or current in arbitrary units. Graph 116 corresponds to one aspect (a transconductance or current) of the ionic channel of the neuron, for example, in response to the membrane potential voltage ($V_{mem} - \alpha_{Ca}$). A graph 118 has a horizontal axis in units of voltage in arbitrary units and a vertical scale in units of current in arbitrary units. Graph 118 corresponds to an output current response of the ionic channel of the neuron in response to a control voltage, which, for example, can be a difference between a membrane potential voltage ($V_{mem}$) and an ionic channel threshold voltage ($E_{Ca}$). While three different relationships are shown under each one of the graphs 114, 116, 118, it is the center relationships of each graph that describes the calcium dependence.

The graphs 114, 116, 118, show neuronal characteristics, and can be compared with the graphs 108, 110, 112 of FIG. 6A, which show circuit characteristics. Thus, the circuit 100 of FIG. 6A provides signal characteristics that emulate characteristics of a neuron.

Figure 7:
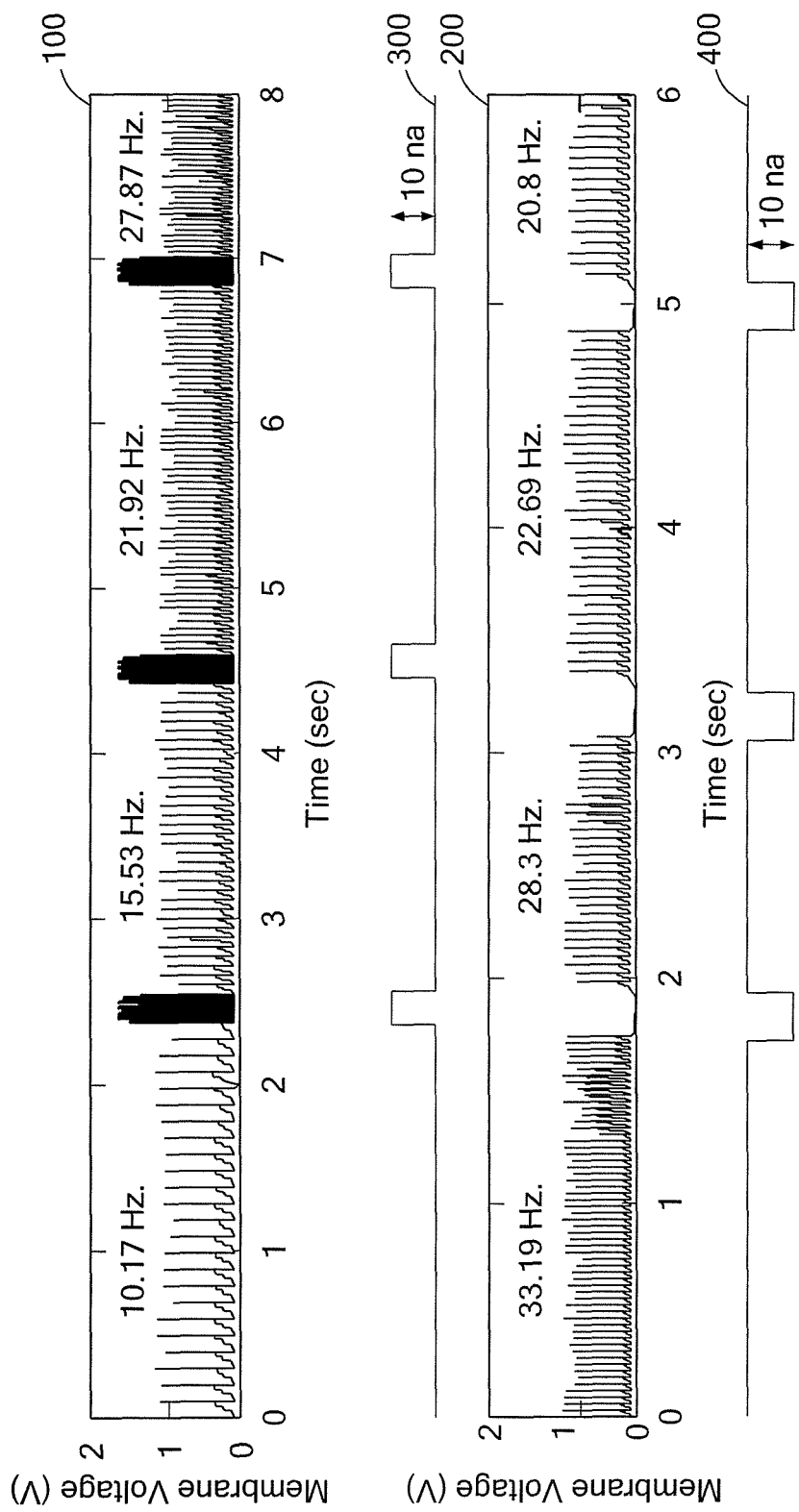
FIG. 7 is a graph showing exemplary inputs and exemplary outputs of the pulse modulated neural integrator circuit of FIGS. 4 and 5.

Referring now to FIG. 7, graphs 100, 200, 300, 400 include horizontal axes with scales in time in units of seconds. Graphs 100, 200, which have relatively high frequency pulse signals, have vertical axes with scales representative of voltage in units of volts, representative of neuron membrane voltage. Graphs 300, 400 having relatively low frequency pulse signals have vertical axes with scales representative of current in arbitrary units.

The graphs 100, 200 are representative of the output voltage signal, $V_{mem}$, 52a at the node, $V_{mem}$, of FIGS. 4 and 5, or the signal, $V'_{mem}$, 70a of FIG. 5. The graphs 300, 400 are representative of the input current signal, Iinject, injected at the node, $V_{mem}$, of FIGS. 4 and 5. In the graph 300, positive going pulses are representative of charge injection into the node, $V_{mem}$, and, in the graph 400, negative going pulses are representative of charge withdrawal from the node, $V_{mem}$.

The graph 300 is representative of three steps of depolarizing currents and the graph 400 is representative of three steps of hyperpolarizing currents. The graph 100, 200 shows resulting firing frequencies (stable frequencies), i.e., the output voltage signal, $V_{mem}$, 52a at the node, $V_{mem}$.

The depolarizing pulses of the graph 300 cause the firing rate of the graph 100 to first increase rapidly and then reduce to a frequency that is higher than its original frequency. Conversely, the polarizing pulses of the graph 400 cause the firing rate of the graph 200 to first decrease rapidly (e.g., to zero) and then increase to a frequency that is lower than its original frequency.

Maximum and minimum saturation firing frequencies should exist for this circuit in accordance with biological behavior described above in conjunction with FIG. 3. As the $[Ca^{2+}]$ signal decreases, the firing frequency decreases indefinitely until it settles down to a baseline firing rate of about 0 Hz. Similarly, as the $[Ca^{2+}]$ signal becomes higher, the firing rate eventually saturates to a maximum frequency of about 69 Hz. This is representative of the behavior of action potential firing in biological neurons.

Some prior research on neural networks employs high-speed digital simulations to characterize these networks' non-linear behavior. However, because the brain is actually a complex analog circuit and possesses properties that are more like analog signals, neuronal behavior can be best emulated using analog VLSI circuits. Analog circuits tend to be more efficient than digital circuits in neural computation because transistor behavior at the sub-threshold region is mathematically similar to the behavior of neural channels. Furthermore, the compact nature (i.e., integrated circuit die size) of analog circuits opens up opportunities for possible interconnections between circuits and real neurons using implantable neuroprosthetic technology.

Analog circuits provide a way to implement a highly nonlinear neuronal behavior. The above circuits and techniques model the CAN channel by lumping its multiple time constants into one time constant. Improvements in the circuit design for the CAN channel can provide consideration all (e.g., four) time constants to increase modeling flexibility. With four time constants, circuits can provide a more complex CAN channel which models ligand dependence behavior of the four time constants.

The neural integrator circuit, i.e., the circuits of FIGS. 4 and 5, is characterized by two timing parameters. A first parameter is referred to herein as an "integration delay," which is a time span after a depolarizing event before the neuron begins integrating. A second parameter is referred to herein as an "integration duration," which is a time span over which neural integration occurs.

In the circuits of FIGS. 4 and 5, the integrator delay occurs because a finite time has to elapse before the intracellular $[Ca^{2+}]$ signal reaches a threshold value. Only after this threshold value is attained, will the integrator of the [X] generation circuits 16, 56 begin integrating. The integrator delay is a significant parameter of the neural integrator because it represents a minimum lead time that a depolarizing or hyperpolarizing stimulus must be presented in order for neural integration to occur. In the circuits of FIGS. 4 and 5, this delay is minimized so that the integrator can respond to high frequency input stimuli.

The integrator delay is affected by four circuit variables. For depolarizing stimuli, the variables that affect the integrator delay are the charging time constant of the $[Ca^{2+}]$ generation circuits (22, 62, FIGS. 4 and 5) and the high $[Ca^{2+}]$ offset voltage (high threshold, e.g., 64c, FIG. 5) of the threshold detector circuits (24, 64, FIGS. 4 and 5). Increasing the high $[Ca^{2+}]$ offset voltage (e.g., 64c, FIG. 5) tends to increase the delay associated with depolarizing stimuli.

For hyperpolarizing stimuli, the variables that affect the integrator delay are the discharging time constant of the $[Ca^{2+}]$ generation circuits (22, 62, FIGS. 4 and 5) and the low $[Ca^{2+}]$ offset voltage (low threshold, e.g., 64d, FIG. 5) of the threshold detector circuits (24, 64, FIGS. 4 and 5). Increasing the high $[Ca^{2+}]$ offset voltage increases the integrator delay for depolarizing stimuli. Decreasing the low $[Ca^{2+}]$ offset voltage (e.g., 64c, FIG. 5) tends to increase the delay associated with hyperpolarizing stimuli.

The delay can also be decreased by modifying the charge and discharge time constant of the $[Ca^{2+}]$ generation circuit (22, 62, FIGS. 4 and 5), for example, by altering a value of the capacitor Ca in FIG. 5.

The next timing parameter is the above-described integration duration. For integration duration, both the indirect and direct $[Ca^{2+}]$ pathways are activated to increase or decrease the CAN current, $I_{CAN}$, after a depolarizing or hyperpolarizing event, respectively. The longer this duration is, the more integration activity occurs. However, this duration is also related to the overall time constant of the charge and discharge path of the $[Ca^{2+}]$ pathways. For a depolarizing input signal step, increasing the charging time constant decreases the integration duration because the increased delay reduces the integration time. For a polarizing input signal step, increasing the discharging time constant increases the integration duration since it extends the time during which $[Ca^{2+}]$ is attenuated, hence the $[Ca^{2+}]$ signal (e.g., 62a, FIG. 5) remains above the high $[Ca^{2+}]$ threshold (e.g., 64c, FIG. 5) for a longer amount of time. The opposite is true for hyperpolarizing steps, where increasing the discharging time constant decreases the integration duration while increasing the charge time constant increases the integration duration.

The circuits of FIGS. 4 and 5 are stable since they have graded (i.e., discrete) changes in firing frequency and since they can maintain a particular firing frequency for a long period of time. In real neurons, stable frequencies are maintained for up to 13 minutes, thus, ideally, the circuits of FIGS. 4 and 5 should be stable for at least 13 minutes.

Instability can occur when a variety of events happen: the firing frequency does not change, the firing frequency decays to zero, or the firing frequency increases indefinitely until it hits a maximum saturation frequency.

There are several sources of potential instability in the circuits of FIGS. 4 and 5. A source of potential instability is related to the [Ca$^{2+}$] gain circuits 20, 60 of FIGS. 4 and 5, respectively. If the gain of these circuits 20, 60 is too high, the firing rate of the respective circuit will saturate when a stimulus is introduced. Conversely, if the gain is too low, the firing rate will not change at all.

To determine what gain values make the circuit stable, it can be determined how the circuits of FIGS. 4 and 5 respond to input stimuli (e.g., to the input signal, Iinject of FIG. 5) while varying the gain of the [Ca$^{2+}$] gain circuit 60 of FIG. 5. In particular, changes of the firing rate of the circuit 50 of FIG. 5 can be measured as a depolarizing or a hyperpolarizing stimulus is injected to the circuit. In some particular embodiments, a stable pulse modulated neural integrator results from a gain of the [Ca] gain circuit 60 between about 0.675 and 0.74. However, in other embodiments, other gains can be used.

Gain of the [Ca$^{2+}$] gain circuit (e.g., 60, FIG. 5) is very important to the stability of the overall pulse modulated neural integrator because it controls how much the direct effect of the [Ca$^{2+}$] concentration signal (e.g., 62a, FIG. 5) affects the conductivity of the CAN channel circuit (e.g., 54, FIG. 5), i.e., the I$_{CAN}$ signal generated by the CAN channel circuit 54. The voltage level produced by the [Ca$^{2+}$] generation circuit (e.g., 62, FIG. 5) can be on the order of 1 to 3 volts having an average graded change (i.e., step size) of about 200 mV. On the other hand, the input range of the CAN channel circuit (e.g., 54, FIG. 5) is on the order of 0 to 150 mV.

Both a voltage level shift and a gain change must be provided by the [Ca$^{2+}$] gain circuit (e.g., 60, FIG. 5). The voltage level shift can be provided using an offset and the gain can be tuned in order to ensure that CAN channel circuit (e.g., 54, FIG. 5) is in a stable operating range. A change of 200 mV with a gain above about 0.74 increases the voltage of the CAN channel circuit 54 by about 150 mV, which results in CAN channel circuit 54 operation above its stable operating range. Thus, the circuit saturates if the gain is too high.

A lower bound for a stable gain value of the [Ca$^{2+}$] gain circuit (e.g., 60, FIG. 5) exists because, if the gain is too low, then the initial increase in frequency of the V$_{mem}$ signal (e.g., 52a, FIG. 5) and the associated [Ca$^{2+}$] signal (e.g., 62a, FIG. 5) would not be high enough to sustain a new higher firing frequency because there is not enough positive feedback in the circuit. As described above, in some embodiments, the lowest gain of the [Ca$^{2+}$] gain circuit (e.g., 60, FIG. 5) is about 0.675.

A second source of instability comes from the [X] generation circuit buffer (e.g., the buffer amplifier in the [X] generation circuit 56 of FIG. 5). A node [X] of the [X] generation circuit 56 in FIG. 5, is connected to the voltage buffer. Two important factors in maintaining stability of the integrator (i.e., the pulse modulated neural integrator 50 of FIG. 5) are the input impedance of the buffer (here an operational amplifier buffer) and a capacitance value of the capacitor, C$_x$, within the [X] generation circuit. The voltage at the node [X] tends to naturally decay because of the finite input impedance of the buffer. To ensure that this decay time is long enough, the buffer has very high input impedance (e.g., ~10 Teraohms).

Using an operational amplifier buffer with high input impedance provides flexibility when choosing the value of the capacitor, C$_x$. In some embodiments, the value of the capacitor, C$_x$, can be between about 2.2 uF and 1000 uF. This range of values allows the circuit to be quite stable against natural decay for long periods of time. However, in other embodiments, the value of the capacitor, C$_x$, can be lower than 2.2 uF or greater than 1000 uF.

It has been observed that, for a capacitance value of 2.2 uF, the pulse modulated neural integrator does not exhibit significant changes in its firing frequency over 24 hours. This is because the time constant of decay is quite high (about 254 days). Thus, it may be possible to choose a much lower capacitance value for the capacitor, C$_x$, which make the capacitor, C$_x$, of a size suitable for integration onto a substrate.

The voltage at the node [X] of the [X] generation circuit 56 of FIG. 5 increases when am upper PMOS FET of the [X] generation circuit 56 is on and decreases when a lower NMOS FET of the [X] generation circuit 56 is on. Ideally, if these transistors are low leakage, when off, they should not conduct any current. However, in reality, the FETS have a finite leakage current. A small leakage current flows from the drain of the PMOS FET to charge the capacitor, C$_x$, even if the transistor is off. Similarly, a leakage current from the NMOS FET also discharges the transistor. Hence, either a net discharging or a net charging results at the node [X] of the [X] generation circuit 56.

In some embodiments, a 2N7000 NMOS FET and a BS250 PMOS FET can be used for the above-described PMOS FET and the NMOS FET of the [X] generation circuit 56, which both have quiescent drain currents of about one uA. Because of device mismatches, leakage currents of the two FETS do not exactly match. This produces a net leakage current at the node [X] on the order of about ±0.2 pA. Using the capacitance law, the voltage at node [X] changes due to the current mismatch in accordance with the following equations:

$$Q = C_x[X]$$

$$\frac{dQ}{dT} = C_x \frac{d[X]}{dT}$$

$$\frac{I}{C_x} = \frac{d[X]}{dT}$$

As the capacitance becomes smaller, the voltage on the capacitor changes much faster. Choosing the value of the capacitor, C$_x$, to be 2.2 uF gives:

$$\frac{d[X]}{dT} = 90.9 \text{ nV/sec}$$

Since the firing rate changes by 1 Hz for every 3.2 mV change in voltage of the signal [X] in the [X] generation circuit 56 of FIG. 5, the theoretical firing rate change is about 0.1 Hz/hour, which is quite stable. Observing the actual integrator 50 of FIG. 5 for about 500 minutes, the actual frequency change is 0.13 Hz/hour.

Figure 8:
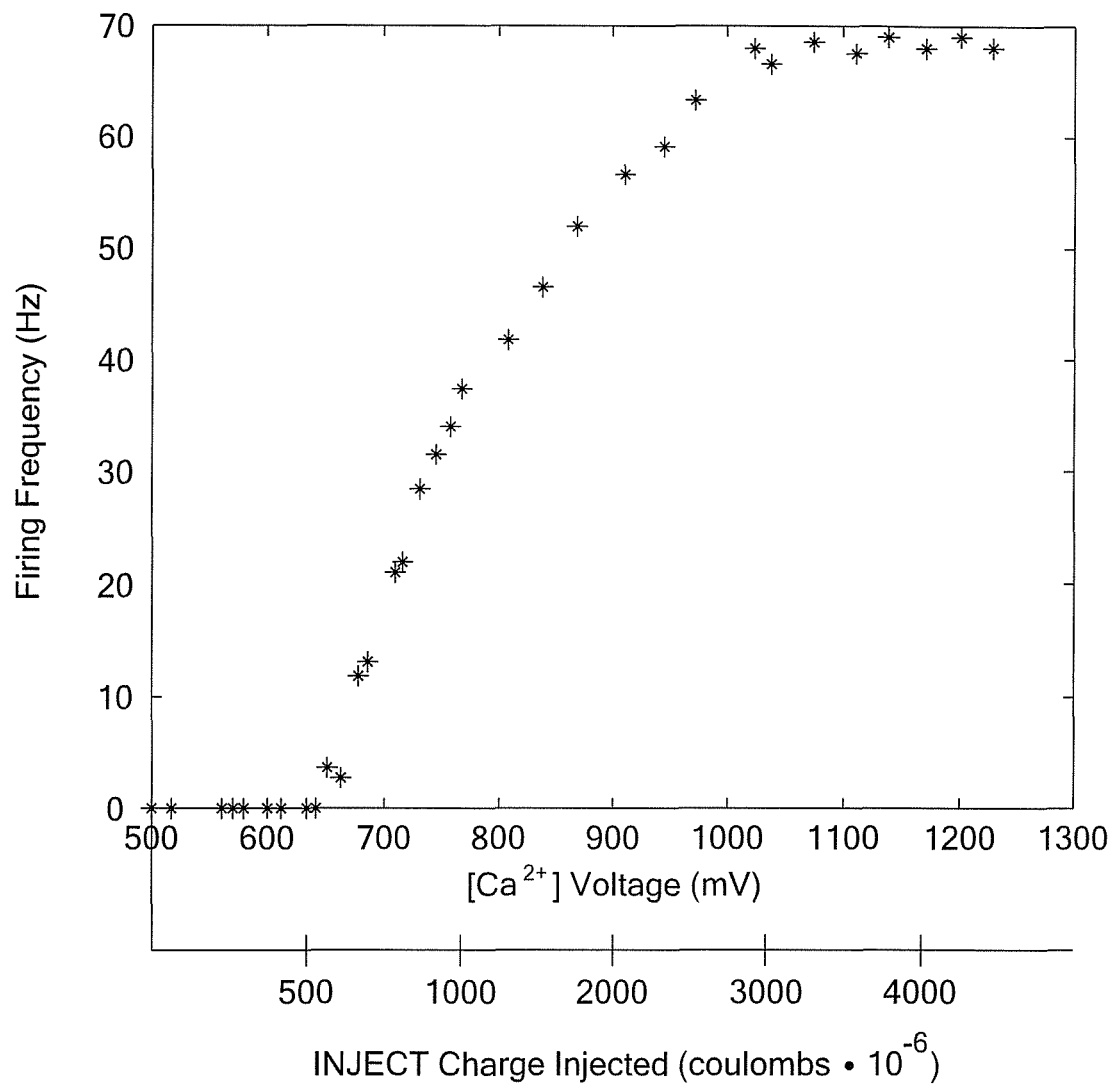
FIG. 8 is a graph showing an input to output relationship of portions of the pulse modulated neural integrator circuit of FIGS. 4 and 5.

Referring now to FIG. 8, a graph has a horizontal scale in units of voltage in millivolts corresponding to voltages of the [Ca$^{2+}$] signal 62a provided by the [Ca$^{2+}$] generation circuit 62 of FIG. 5. The graph also has another horizontal scale in units of charge in coulombs corresponding to charge associated with the current pulse input signal, Iinject (FIG. 5). The graph has a vertical scale in units of frequency in Hertz, corresponding to the frequency of the voltage signal, V$_{mem}$, 52a at the V$_{mem}$ node of FIG. 5.

The graph includes a curve representative of circuit firing frequency versus injected charge, Iinject, 68a at the node, V$_{mem}$, and also versus the [Ca$^{2+}$] signal 62a.

The input to the pulse modulated neural integrator circuit 50 of FIG. 5 is a current pulse signal, Iinject, (68a, FIG. 5) and is the primary way to modulate the behavior of the pulse modulated neural integrator. The input pulse can be long or short. A total amount of charge injected into the circuit can be controlled to increase the voltage across the capacitor, $C_{int}$, in the somatic spiking circuit 52 of FIG. 5.

Largest and smallest limiting charge values are represented in FIG. 8. The largest charge value is around 4000 coulombs and the smallest charge value is around 600 coulombs. Between these two values, the amount of frequency change increases non-linearly with the amount of charge injected. If a charge higher than the largest value is injected, the frequency of the signal, Vmem, 52a does not become higher than a highest frequency.

The $[Ca^{2+}]$ signal 62a similarly reaches largest and smallest values. The largest value is representative of a maximum $[Ca^{2+}]$ concentration within a neuron. If the $[Ca^{2+}]$ signal 62a reaches the largest value, the frequency of the signal, $V_{mem}$, 52a does not become higher than the heist value. Similarly, if the $[Ca^{2+}]$ signal 62a reaches the smallest value, which is representative of a lowest $[Ca^{2+}]$ concentration within a neuron, the frequency of the signal, $V_{mem}$, 52a becomes near zero.

It will be recognized that the curve of FIG. 8 shows discrete stable states (e.g., discrete steps of firing frequency) in closed-loop operation of the circuit 50 of FIG. 5. The curve is representative of the firing frequency at the node, Vmem, shown in FIG. 5 that varies from 0 to 70 Hz depending on the voltage of the $[Ca^{2+}]$ concentration signal 62a, which can be modified by external injected charge 68a.

Figure 9:
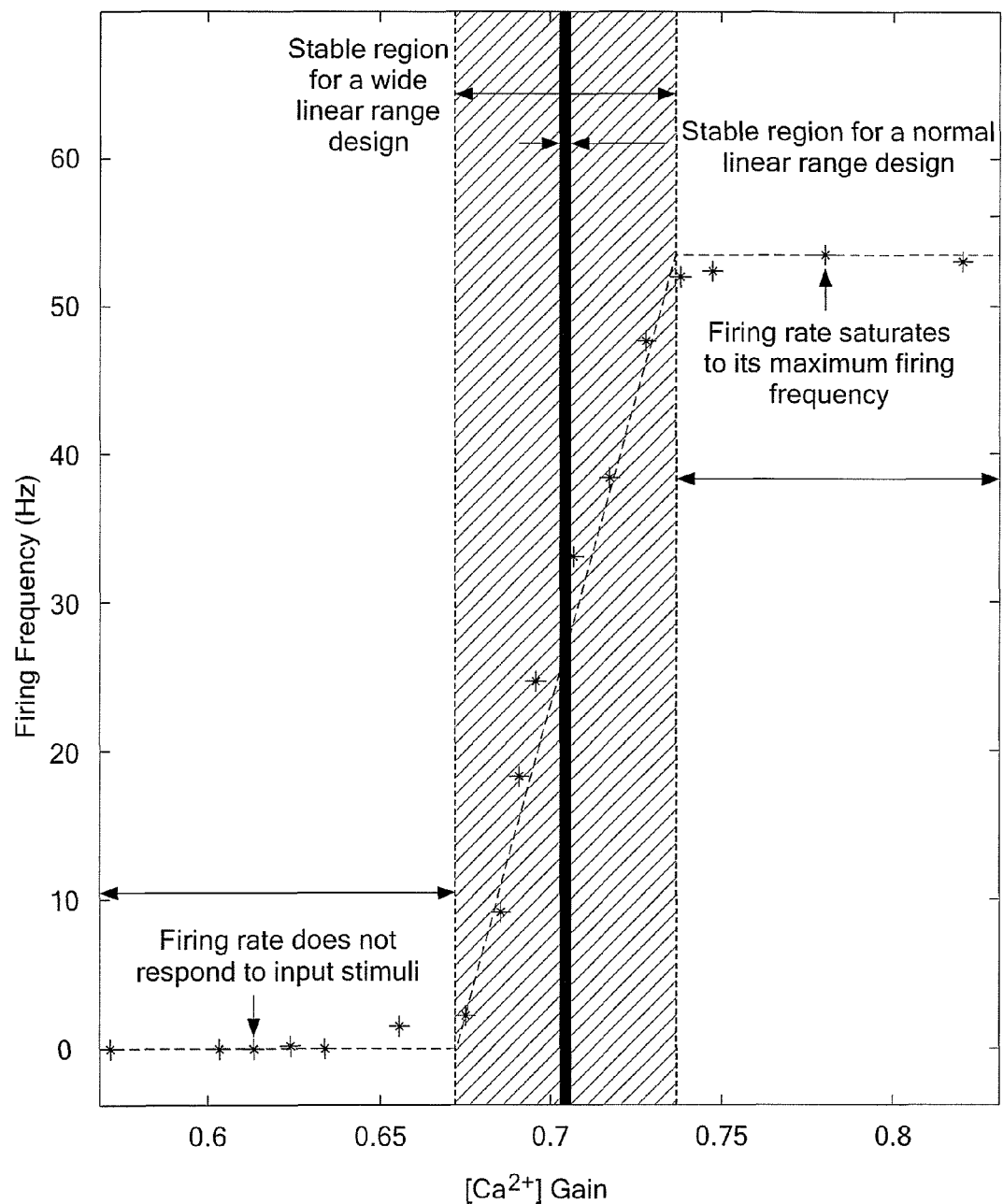
FIG. 9 is another graph showing an input to output relationship of portions of the pulse modulated neural integrator circuit of FIGS. 4 and 5.

Referring now to FIG. 9, a graph includes a horizontal axis with a scale in units of gain of the $[Ca^{2+}]$ gain circuits 20, 60 of FIGS. 4 and 5, respectively, and a vertical axis with a scale in units of frequency of the signal, $V_{mem}$, 12A, 52A of the circuits of FIGS. 4 and 5, respectively.

The graph includes a curve representative of frequency change of the signal 52a of FIG. 5 versus a gain of the [Ca] gain circuit 60 of FIG. 5.

As shown, a stable region (i.e., linear region) of the pulse modulated neural integrator 50 of FIG. 5, which has positive feedback but with graded states to achieve stability, is approximately 20 times wider than an estimated stable region of a conventional (normal) linear design.

Figure 10:
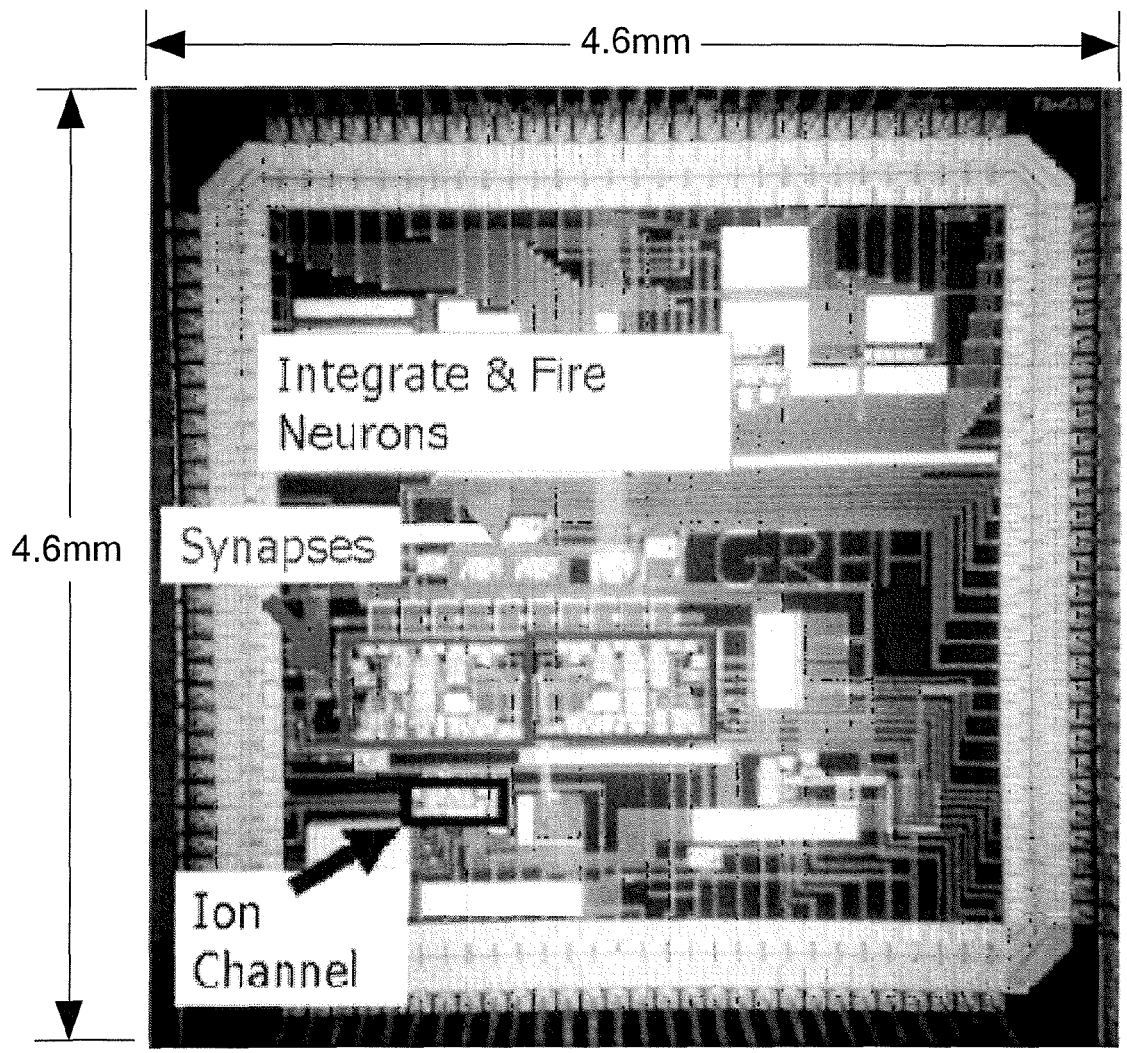
FIG. 10 is a photograph showing a portion of the pulse modulated neural integrator circuit of FIGS. 4 and 5 integrated onto a circuit die.

Referring now to FIG. 10, an integrated circuit die has integrated thereon certain part of the pulse modulated neural integrator 50 of FIG. 5. Namely the integrated circuit die includes the somatic spiking circuit 52, the spike detector circuit 58, and the CAN channel circuit 54 of FIG. 5. In other embodiments, all of or other parts of the pulse modulated neural integrator 50 of FIG. 5 can be included on the integrated circuit die.

Phase Locked Loops

Phase-locked loops (PLLs) are a core component of many wireless communication devices from cell phones to GPS's. An ideal PLL should track the desired signal in a very short period of time (settling time) and then stay put indefinitely once the signal is locked. However, in the traditional PLL design (using a charge-pump capacitor) there is always a tradeoff. A small settling time corresponds to the use of a small charging capacitor with a small time constant. On the other hand, to achieve a stable output, the decay time constant should be large, which corresponds to a large capacitance that responds slowly. However, the capacitor voltage may drift significantly from its desired value due to tunneling and leakage current, resulting in frequency shift and large jitters. These problems cannot be easily solved using traditional engineering design approaches.

The brain constantly acquires information quickly and keeps it in short-term memory for hours or days (e.g., remembering where the car was parked in the parking lot). The brain also uses a PLL-like mechanism in order to "tune in" to sensory signals that call for selective attention and short-term memory.

As described above, wide-dynamic-range neuromorphic analog very-large-scale-integration (analog VLSI) transistor circuits can emulate short-term memory in brain networks. This circuit design can be used in a PLL in that: (i) the neuromorphic analog VLSI circuits operate at exceedingly low current levels, typically in pico-amperes; (ii) they are compact and portable; (iii) they offer the best combination of fast tracking and minimal frequency shifts and jittering; (iv) there is no need for a large charge pump capacitor. A PLL chip that uses the above described pulse modulated neural integrator circuit can supplant current PLL circuit designs based on charge-pump capacitors and voltage-controlled oscillators, which are bulky, costly, power-inefficient, and have poor tracking-stabilization tradeoffs.

This "persistent activity" working memory model is analogous to a charge pump and voltage-controlled oscillator (VCO) combination that is typically used in PLL designs. In contrast to the traditional design, however, the working memory model does not need large capacitors to hold the control voltage for the VCO. Instead, the control voltage of the VCO is maintained by a positive feedback through non-linear interaction of circuits that emulated membrane ionic currents. Stability of the positive feedback is ensured by the intrinsic nonlinear attractor dynamics of the $I_{CAN}$ current and $K_{Ca}$ (potassium) current (see, e.g., FIG. 5). The resulting control voltage does not decay appreciably even after days of operation.

Since capacitor sizes can be very small when using the above-described circuits, a PLL using the above-described circuits can rapidly track its desired frequency. Once the output frequency locks in response to a stimulus, the positive feedback loop will maintain the control voltage. Therefore the settling time and stable output requirements are decoupled in the pulse modulated neural integrator approach. The output frequency of the neuromorphic PLL is therefore potentially rapidly adjustable and extremely stable.

Current design challenges for communication circuits, including PLLs, are their susceptibility to current leakages, their large capacitor size, and device mismatches. PLLs have already been widely used in electronic products such as cell phones [11], global positioning system (GPS), and WiMax projects. The sales of cell phones achieved more than 1.15 billion in 2007, a 16% increase from 2006. In 2007 alone, 33.9 millions of GPS units were sold, almost triple the 11.9 million sold in 2006. A majority of these communications-navigation systems will be shipped to developing Asia-Pacific countries such as India and China by 2012. It would, therefore, be desirable to provide a high-performance PLLs that meet the following criteria: low jitters, robustness to device variations, low power consumption, stable output frequency with little attenuation, miniaturized, and low cost. The above-described circuits can lead to a PLL having these desirable characteristics.

Figure 11:
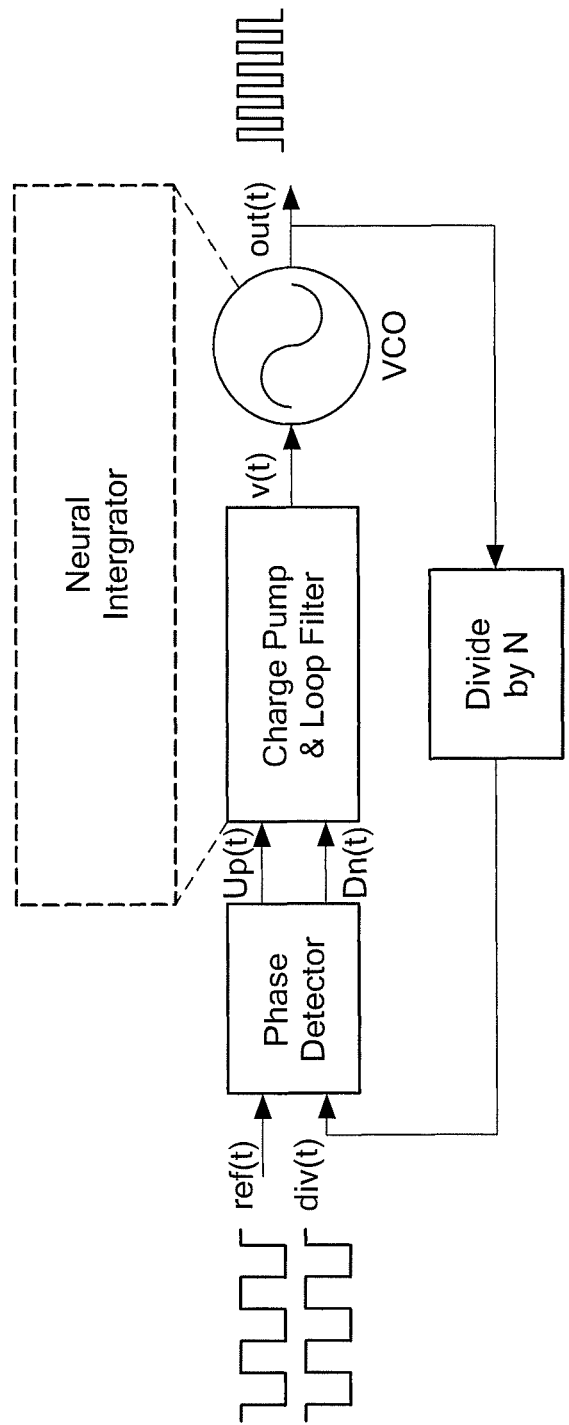
FIG. 11 is a block diagram of a phase locked loop (PLL) that can use the pulse modulated neural integrator circuit of FIGS. 4 and 5 within a feedback loop.

Referring now to FIG. 11, a conventional phase locked loop (PLL) includes a phase detector coupled to receive an input signal (ref(t)) and coupled to receive a feedback signal (div(t)). The phase detector is configured to compare the phases of the input signal and the feedback signal and to generate a first phase signal (Up(t)) indicative of the relative phases being in one direction and a second phase signal (Dn(t)) representative of the relative phases being in the other direction.

A charge pump and loop filter are coupled to receive the first and second phase signals and configured to generate a filtered signal (v(t)). A voltage controlled oscillator is coupled to receive the filtered signal and configured to generate an output signal (out(t)). A divide by N circuit is coupled to receive the output signal and configured to generate the feedback signal.

It will be recognized that, in operation, the output signal, out(t), has a frequency N times a frequency of the input signal, ref(t). Thus, the PLL can be used to multiply upward the frequency of the input signal. The PLL can also selectively multiply upward the frequency of the input signal in the cases for which the divide by N circuit has a selectable factor N.

As shown, the neural integrator circuits 10, 50 of FIGS. 4 and 5, respectively, can replace the charge pump and loop filter and also the VCO. In some embodiments, the input of the neural integrator 50 is a voltage input as can be provided by the input transconductance amplifier 68 shown in FIG. 5 and the output of the neural integrator 50 is a voltage as provided by the buffer output amplifier 70 as shown in FIG. 5.

With this arrangement, in operation, in response to pulses of the phase signal Up(t), which can correspond to the positive pulses of the graph 300 of FIG. 7 and to positive pulses of a Vinject signal 72 of FIG. 5, a frequency of the output signal, out(t), can take discrete upward frequency steps as does the graph 100 of FIG. 7 and as does the output signal 70a of FIG. 5, in order to maintain a frequency and phase of the feedback signal, div(t), equal to a frequency and phase of the input signal, ref(t). Similarly, in response to pulses of the phase signal, Dn(t), which can correspond to the negative pulses of the graph 400 of FIG. 7 and to negative pulses of the Vinject signal 72 of FIG. 5, a frequency of the output signal, out(t), can take discrete downward frequency steps as does the graph 100 of FIG. 7 and as does the output signal 70a of FIG. 5, in order to maintain the frequency and phase of the feedback signal, div(t), equal to a frequency and phase of the input signal, ref(t).

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. An electronic circuit operationally representative of signal propagation between a first neuron and a second neuron, comprising:
    a circuit input node coupled to the electronic circuit;
    a circuit output node coupled to the electronic circuit, wherein a pulse energy of a circuit input signal at the circuit input node influences a circuit output signal at the circuit output node to take on a respective one of a plurality of discrete stable frequency states; and
    a CAN channel circuit, comprising:
        a CAN channel circuit input node at which a CAN channel circuit input signal is received;
        a log domain filter (LDF) configured to receive the CAN channel circuit input signal and configured to generate a filtered output signal;
        a wide range differential pair (WR-DP) comprising differentially coupled FETs coupled to receive a signal representative of the filtered output signal and configured to generate a wide-range output signal; and
        a current-generating circuit coupled to receive the wide-range output signal and configured to generate a CAN channel current signal (Ican) into the circuit input node, wherein the CAN channel circuit is representative of a biological CAN channel and wherein the CAN channel current signal is representative of a current passing between the first and second neurons.

2. The electronic circuit of claim 1, wherein the circuit output signal responds to a pulse current circuit input signal by changing to a different state having a different discrete frequency.

3. The electronic circuit of claim 1, wherein the electronic circuit comprises a plurality of analog VLSI components coupled together and configured to operate in a sub-threshold mode.

4. The electronic circuit of claim 1, wherein the CAN channel circuit further comprises:
    a $V_{mem}$ node corresponding to the circuit output node and also corresponding to the circuit input node, wherein the circuit output signal is influenced by a pulse current circuit input signal injected at the $V_{mem}$ node, wherein the circuit output signal is also influenced by the CAN channel current signal (Ican) into the $V_{mem}$ node.

5. The electronic circuit of claim 1, further comprising a somatic spiking circuit coupled to the circuit output node and configured to generate the circuit output signal as a voltage signal at the circuit output node.

6. The electronic circuit of claim 1, wherein the circuit output signal is representative of activation potentials associated with the first neuron, and wherein the CAN channel current signal (Ican) is representative of a biological Ican current in a biological CAN channel associated with the second neuron.

7. The electronic circuit of claim 1, further comprising:
    a [Ca] generation circuit coupled to receive a signal representative of the circuit output signal, configured to integrate the signal representative of the circuit output signal, and configured to generate a [Ca] concentration output signal representative of a concentration of calcium within the first neuron; and
    a threshold detector circuit coupled to receive the [Ca] concentration output signal, configured to generate a high threshold signal and a low threshold signal, configured to compare the [Ca] concentration output signal to the high threshold signal and to the low signal, and configured to generate at least one comparison output signal in response to the comparison and representative of the [Ca] concentration output signal being above the high threshold or below the low threshold.

8. The electronic circuit of claim 7, wherein the threshold detector circuit comprises a filter circuit coupled to receive the [Ca] concentration output signal and configured to generate a filtered [Ca] concentration signal, wherein the high threshold signal and the low threshold signal are related to the filtered [Ca] concentration signal.

9. The electronic circuit of claim 7, further comprising:
    a spike detector circuit coupled to receive the circuit output signal and configured to generate a squared output signal having a frequency the same as the circuit output signal, wherein the square output signal is the signal representative of the circuit output signal received by the [Ca] generation circuit.

10. The electronic circuit of claim 9, further comprising:
a [Ca] gain circuit coupled to receive the [Ca] concentration output signal, configured to apply a gain to the [Ca] concentration output signal, and configured to generate a gained output signal; and
an [X] generation circuit coupled to receive the at least one comparison output signal and configured to generate an [X] concentration output signal responsive to at least one comparison signal, wherein the CAN channel circuit input node comprises a summing node at which the gained output signal and the [X] concentration output signal are received and summed to provide a summed signal, wherein the summed signal corresponds to the CAN channel circuit input signal.

11. The electronic circuit of claim 10, wherein the somatic spiking circuit, the spike detector circuit, the [Ca] generation circuit, the [Ca] gain circuit, the threshold detector circuit, the [X] generation circuit, and the CAN channel circuit are comprised of analog components.

12. The electronic circuit of claim 10, wherein at least one of the somatic spiking circuit, the pike detector circuit, the [Ca] generation circuit, the [Ca] gain circuit, the threshold detector circuit, the [X] generation circuit, or the CAN channel circuit are comprised of analog VLSI components disposed on an integrated circuit die.

13. The electronic circuit of claim 12, wherein a plurality of the analog VLSI components are configured to operate in a sub-threshold mode.

14. The electronic circuit of claim 7, further comprising:
a [Ca] gain circuit coupled to receive the [Ca] concentration output signal, configured to apply a gain to the [Ca] concentration output signal, and configured to generate a gained output signal; and
an [X] generation circuit coupled to receive the at least one comparison output signal and configured to generate an [X] concentration output signal responsive to at least one comparison signal, wherein the CAN channel circuit input node comprises a summing node at which the gained output signal and the [X] concentration output signal are received and summed to provide a summed signal, wherein the summed signal corresponds to the CAN channel circuit input signal.

15. The electronic circuit of claim 14, wherein at least one of the somatic spiking circuit, the [Ca] generation circuit, the [Ca] gain circuit, the threshold detector circuit, the [X] generation circuit, or the CAN channel circuit are comprised of analog VLSI components disposed on an integrated circuit die.

16. The electronic circuit of claim 15, wherein a plurality of the analog VLSI components are configured to operate in a sub-threshold mode.

17. The electronic circuit of claim 1, further comprising:
a [Ca] generation circuit coupled to receive a signal representative of the circuit output signal, configured to integrate the signal representative of the circuit output signal, and configured to generate a [Ca] concentration output signal representative of a concentration of calcium within the first neuron; and
a threshold detector circuit coupled to receive the [Ca] concentration output signal, configured to generate a high threshold signal and a low threshold signal, configured to compare the [Ca] concentration output signal to the high threshold signal and to the low signal, and configured to generate at least one comparison output signal in response to the comparison and representative of the [Ca] concentration output signal being above the high threshold or below the low threshold.

18. The electronic circuit of claim 17, wherein the threshold detector circuit comprises a filter circuit coupled to receive the [Ca] concentration output signal and configured to generate a filtered [Ca] concentration signal, wherein the high threshold signal and the low threshold signal are generated in accordance with the filtered [Ca] concentration signal.

19. A method of operationally representing of signal propagation between a first neuron and a second neuron, comprising:
generating a signal that takes on a plurality of discrete stable frequency states, wherein the frequency state changes to a different discrete frequency state in response to a pulse signal received at a circuit input node; and
with a CAN channel circuit, an electronic circuit having a CAN channel circuit input node:
receiving a CAN channel circuit input signal at the CAN channel circuit input node;
filtering the CAN channel circuit input signal with a log domain filter (LDF) to generate a filtered output signal;
amplifying a signal representative of the filtered output signal with a wide range differential pair (WR-DP) comprising differentially coupled FETs to generate a wide-range output signal; and
generating a CAN channel current signal (Ican) into the circuit input node with a current-generating circuit coupled to receive the wide-range output signal, wherein the CAN channel circuit is representative of a biological CAN channel and wherein the CAN channel current signal is representative of a current passing between the first and second neurons.

20. The method of claim 19, wherein the generating the signal that takes on the plurality of discrete stable frequency states is performed by an analog VLSI circuit.

21. An electronic circuit operationally representative of signal propagation between a first neuron and a second neuron, comprising;
a circuit input node coupled to the electronic circuit;
a circuit output node coupled to the electronic circuit, wherein a pulse energy of a circuit input signal at the circuit input node influences a circuit output signal at the circuit output node to take on a respective one of a plurality of discrete stable frequency states;
a [Ca] generation circuit coupled to receive a signal representative of the circuit output signal, configured to integrate the signal representative of the circuit output signal, and configured to generate a [Ca] concentration output signal representative of a concentration of calcium within the first neuron; and
a threshold detector circuit coupled to receive the [Ca] concentration output signal, configured to generate a high threshold signal and a low threshold signal, configured to compare the [Ca] concentration output signal to the high threshold signal and to the low signal, and configured to generate at least one comparison output signal in response to the comparison and representative of the [Ca] concentration output signal being above the high threshold or below the low threshold, wherein the threshold detector circuit comprises a filter circuit coupled to receive the [Ca] concentration output signal and configured to generate a filtered [Ca] concentration signal, wherein the high threshold signal and the low threshold signal are generated in accordance with the filtered [Ca] concentration signal.

* * * * *